Oct. 16, 1934.　　　L. E. PARKER　　　1,977,203
MACHINE FOR MAKING MATCH PACKETS
Original Filed Oct. 28, 1931　　25 Sheets-Sheet 7

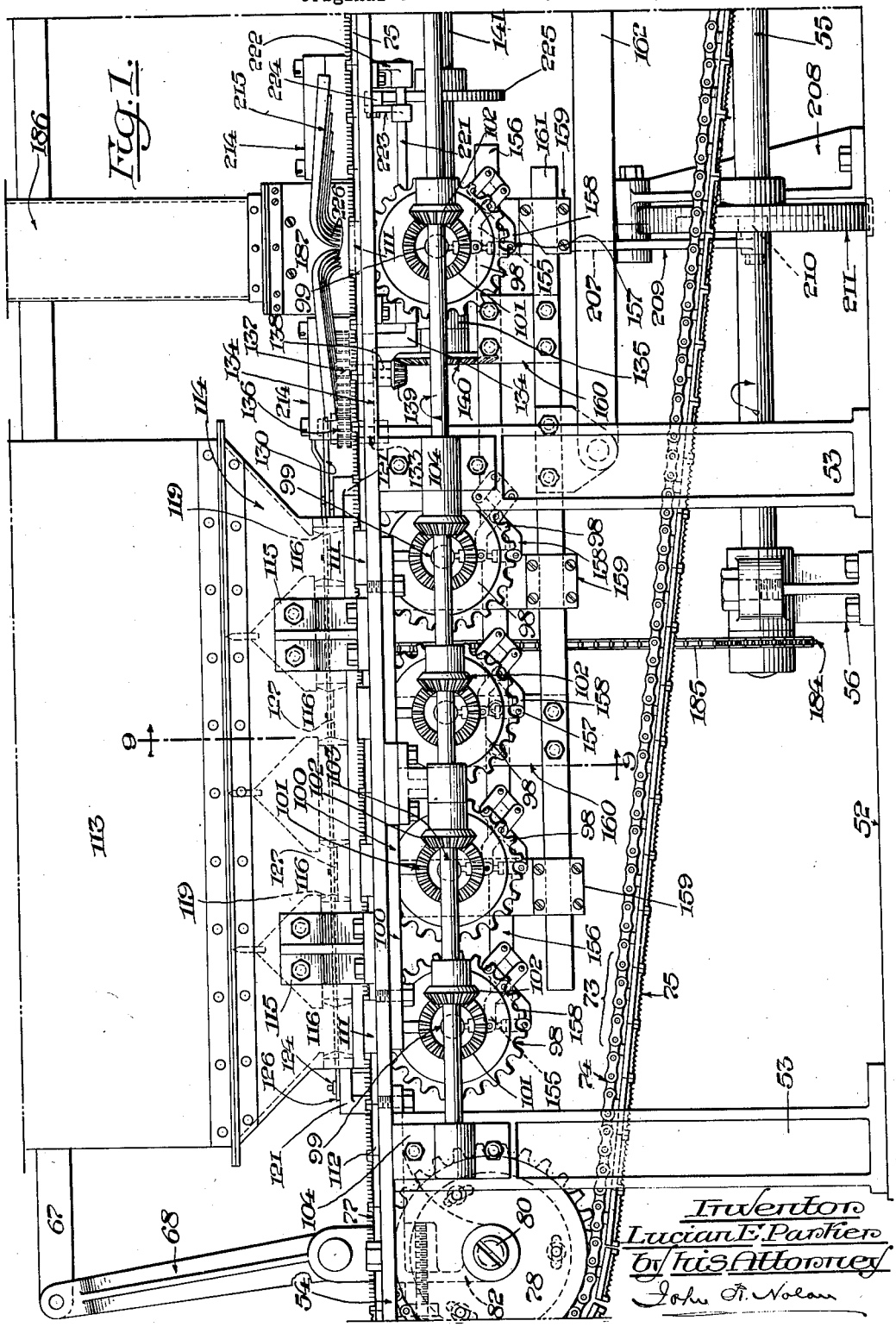

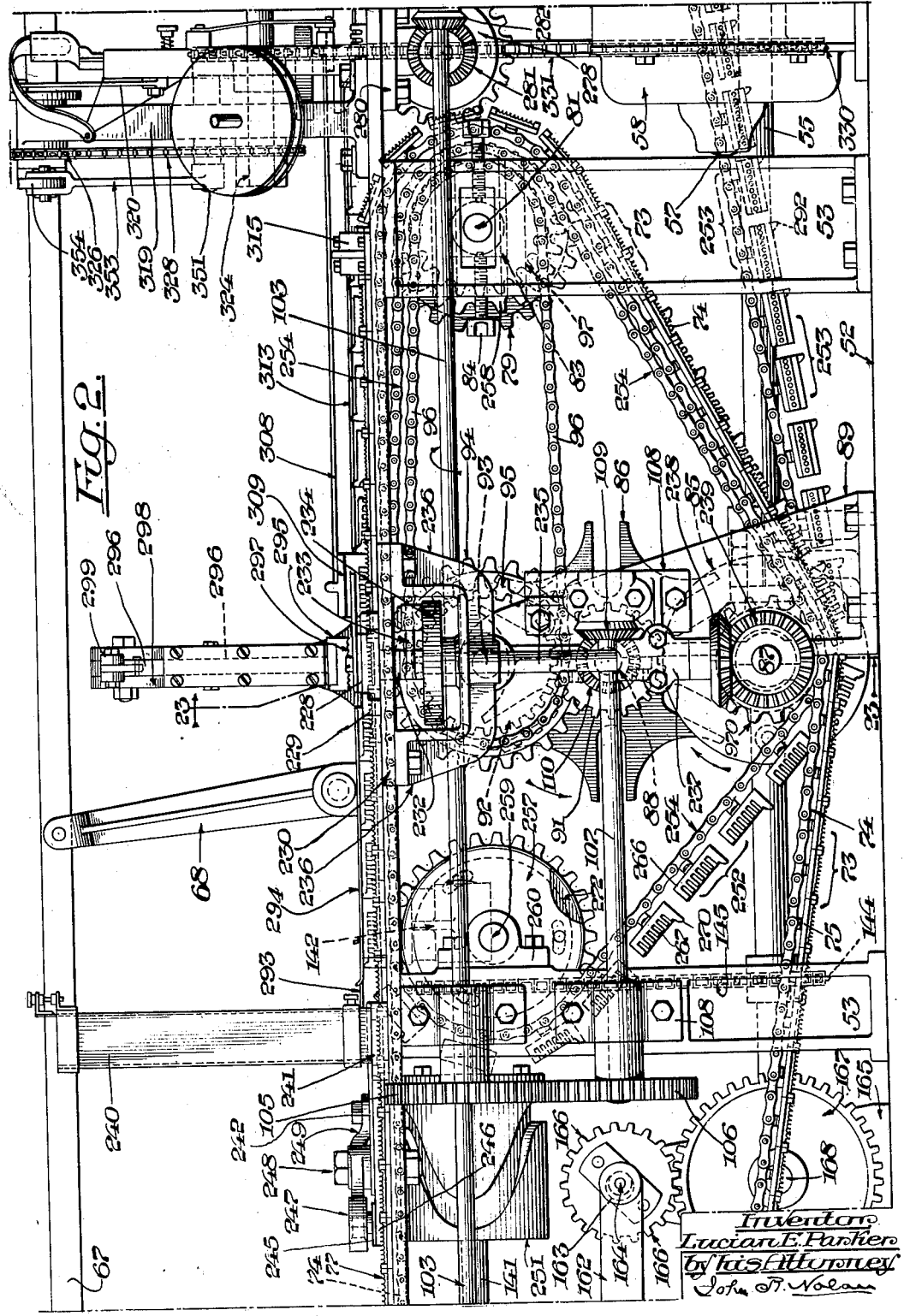

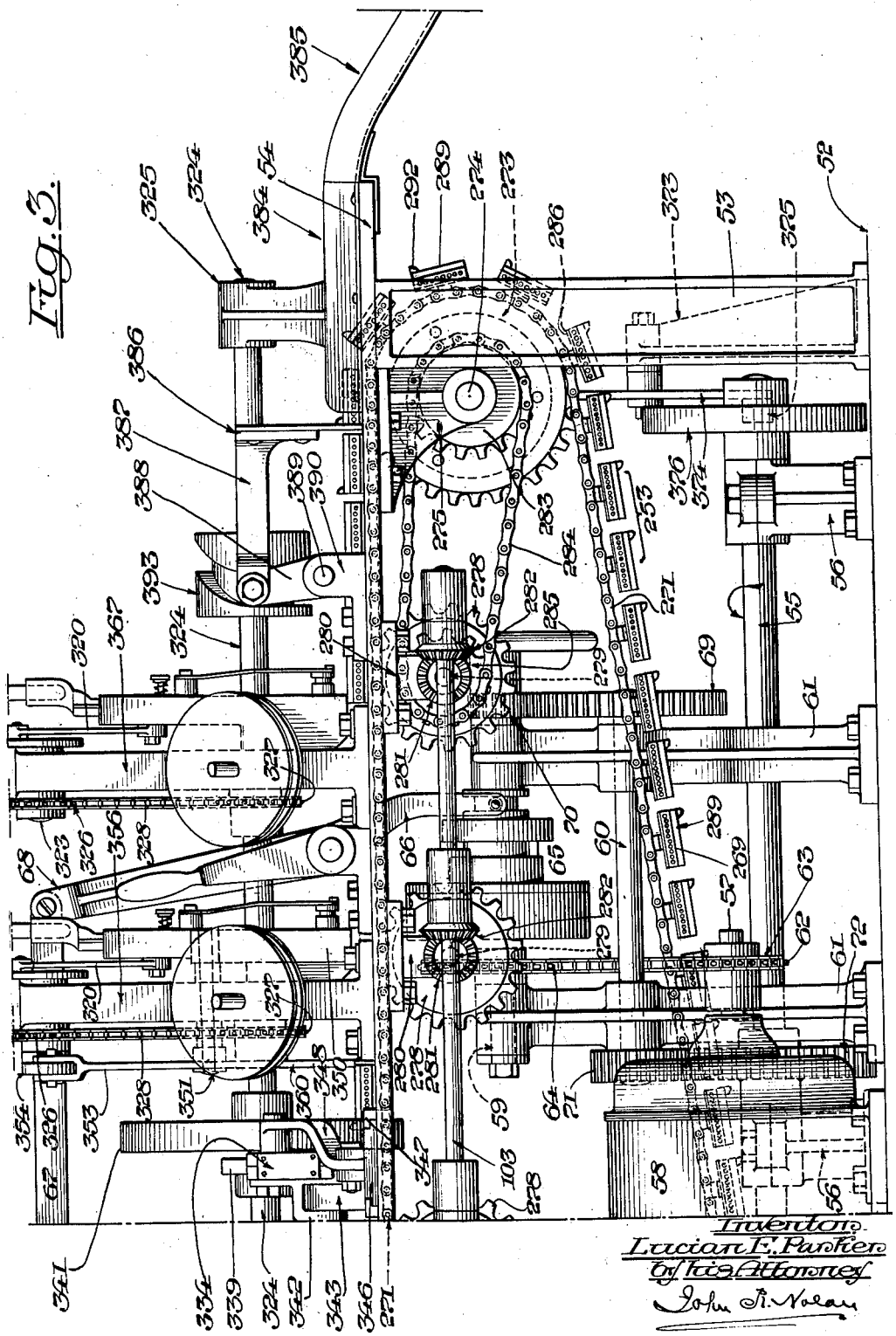

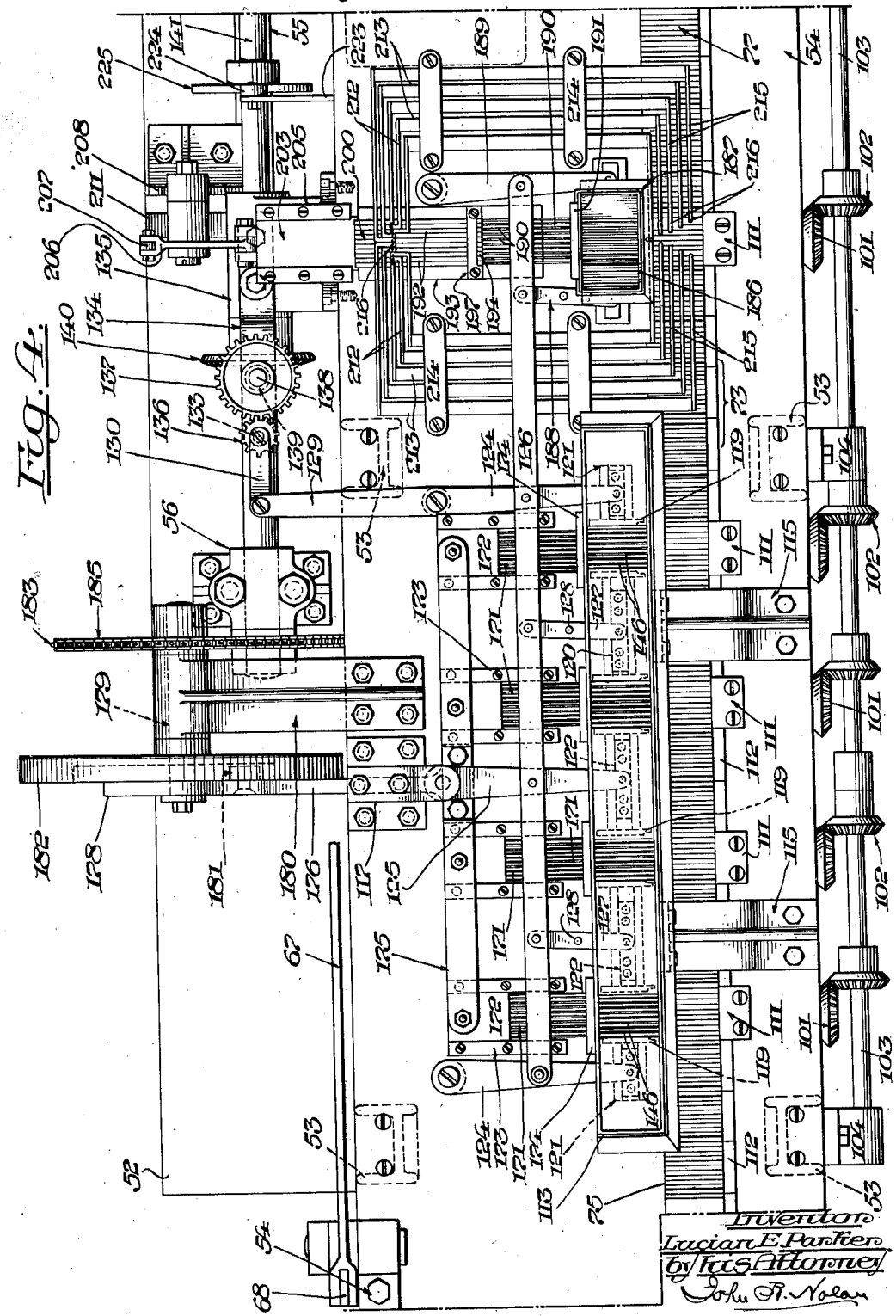

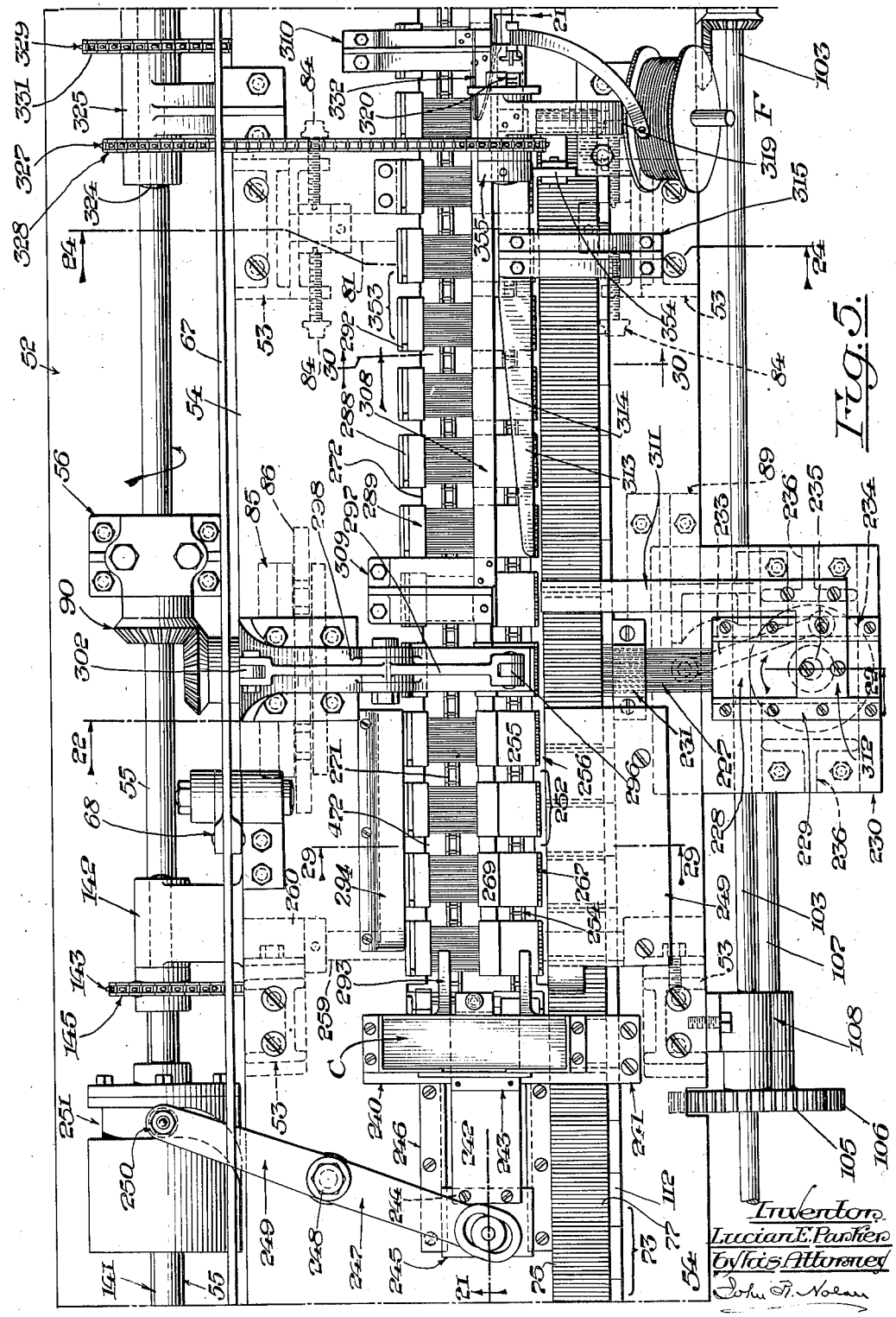

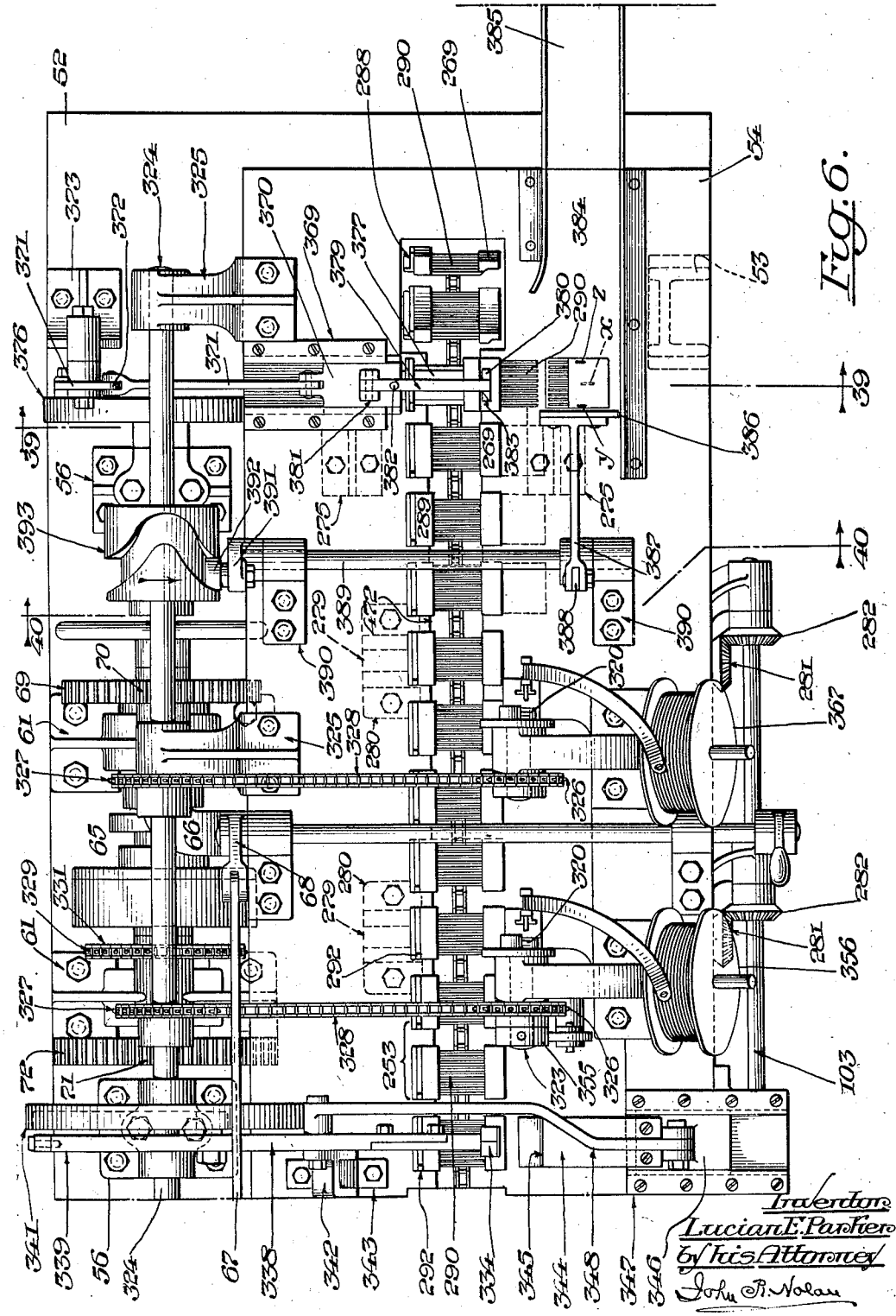

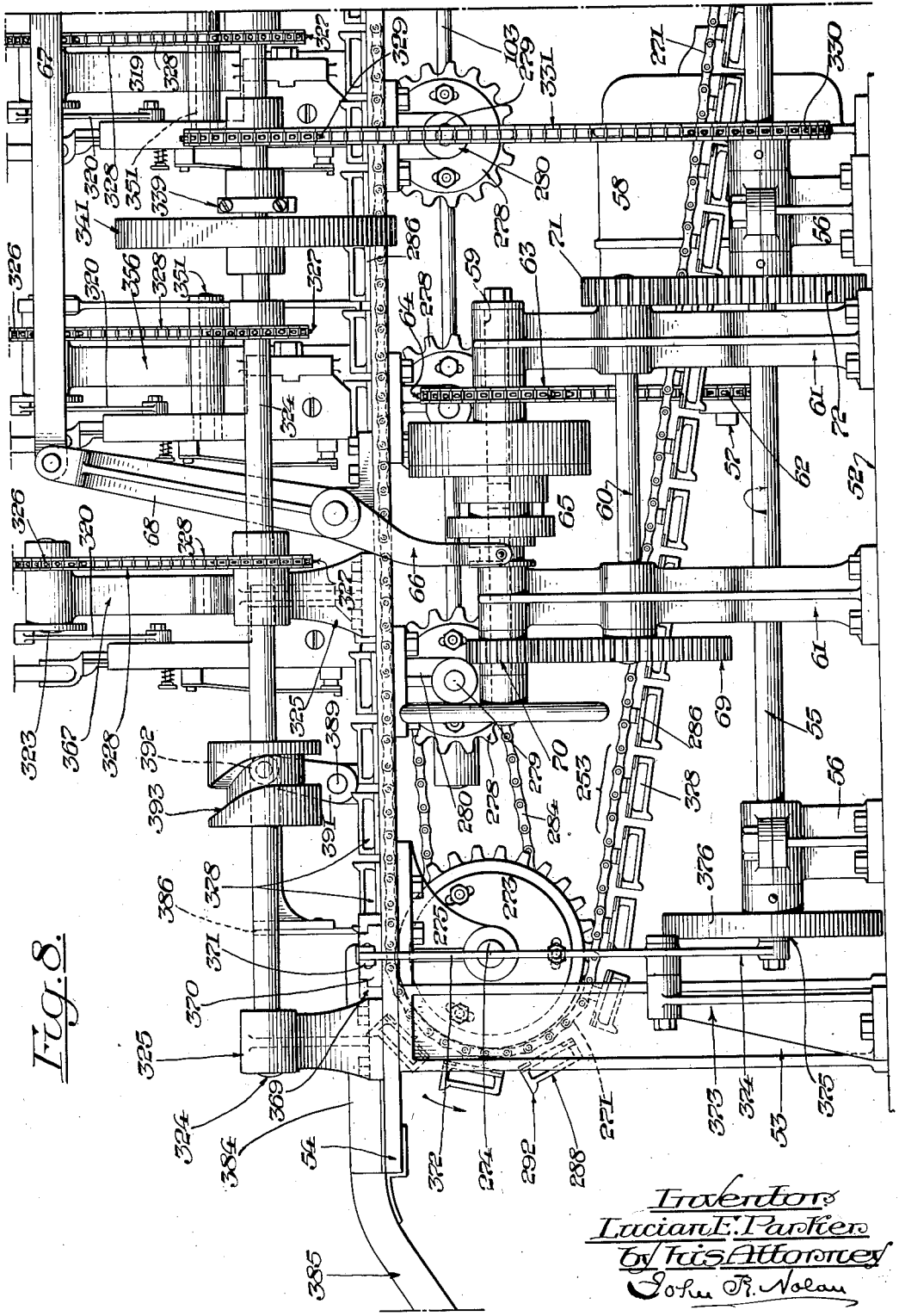

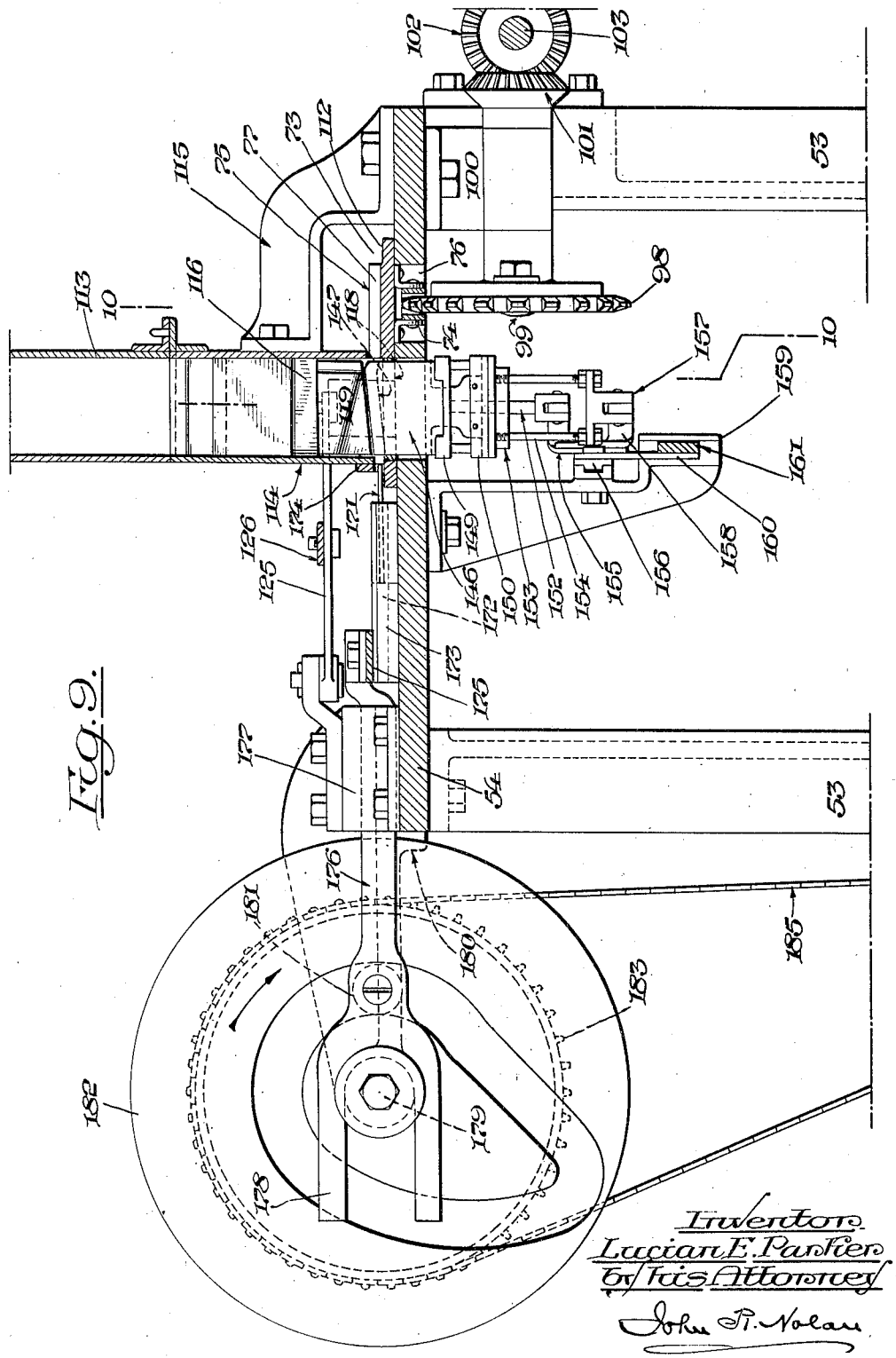

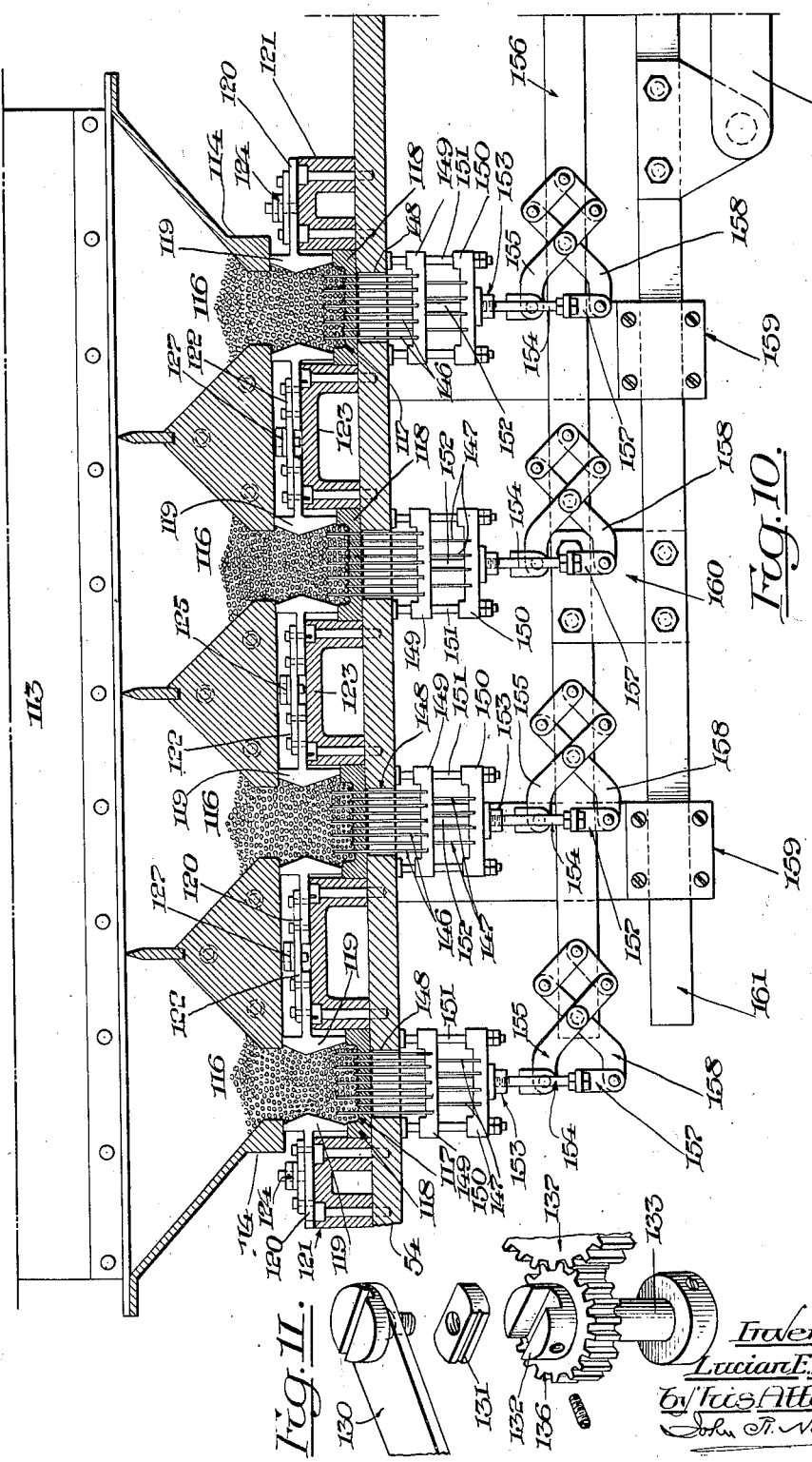

Oct. 16, 1934.  L. E. PARKER  1,977,203
MACHINE FOR MAKING MATCH PACKETS
Original Filed Oct. 28, 1931  25 Sheets-Sheet 11
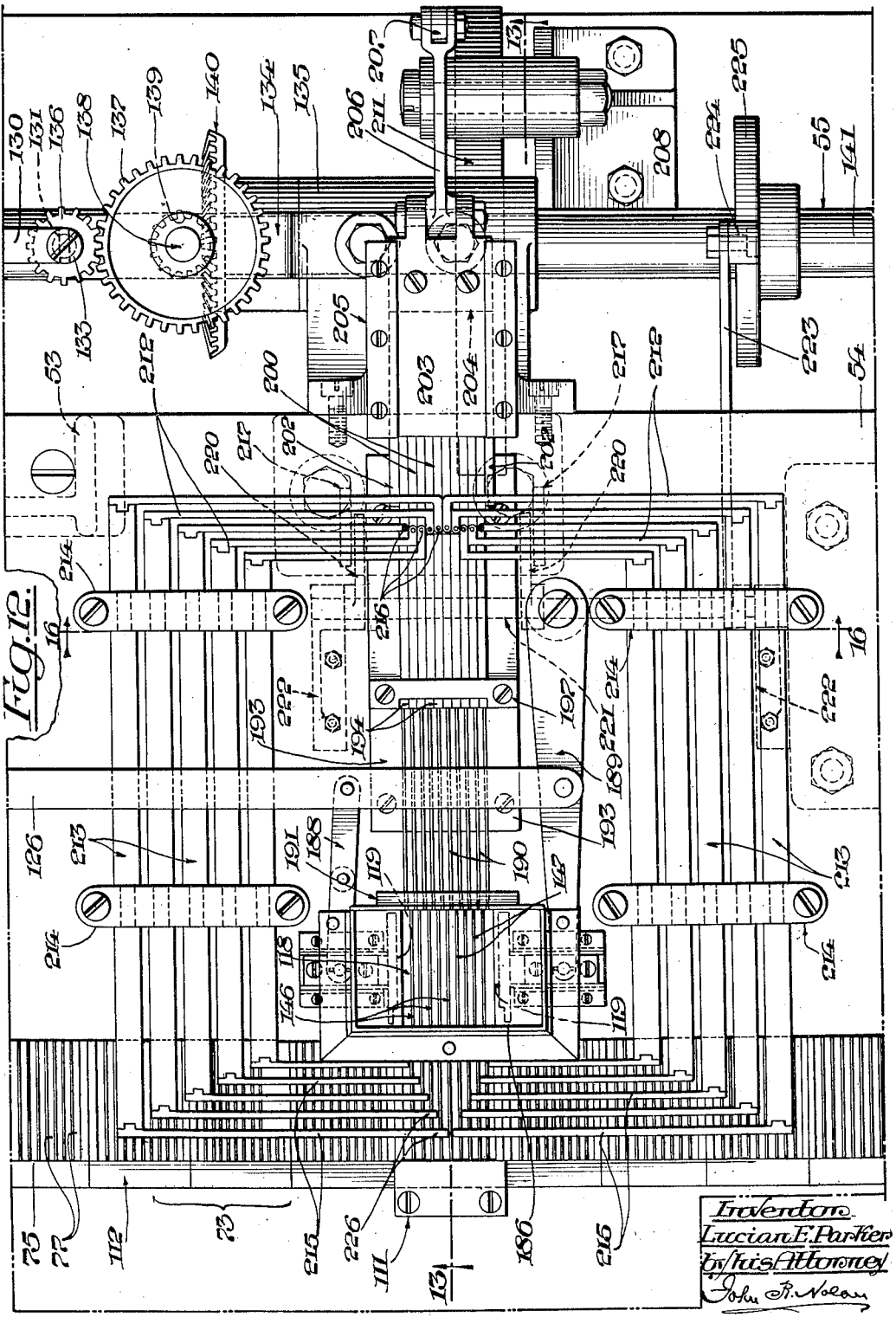

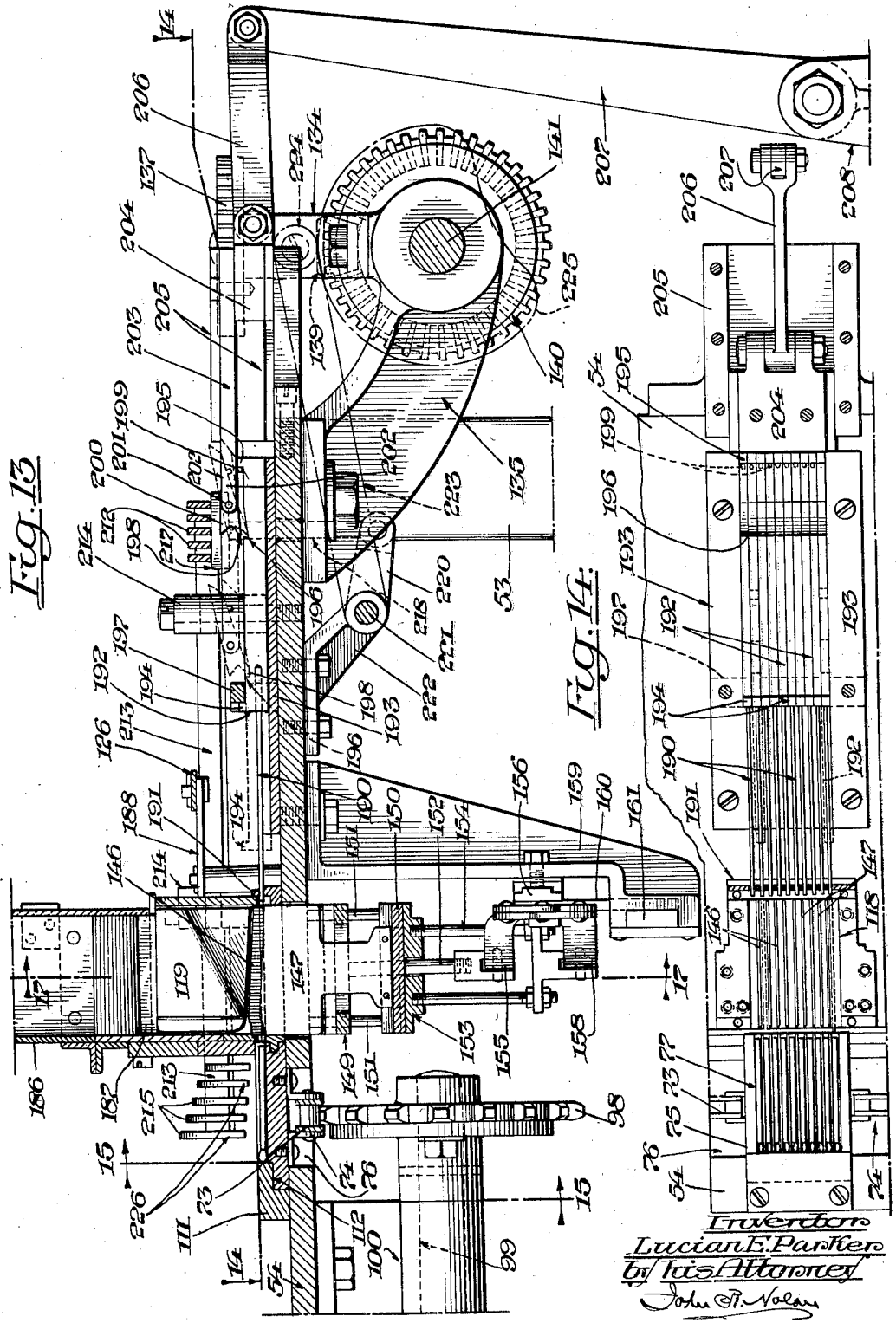

Oct. 16, 1934.                L. E. PARKER                1,977,203
                      MACHINE FOR MAKING MATCH PACKETS
                  Original Filed Oct. 28, 1931    25 Sheets-Sheet 13

Inventor
Lucian E. Parker
by his Attorney
John R. Nolan

Oct. 16, 1934.  L. E. PARKER  1,977,203
MACHINE FOR MAKING MATCH PACKETS
Original Filed Oct. 28, 1931  25 Sheets-Sheet 14
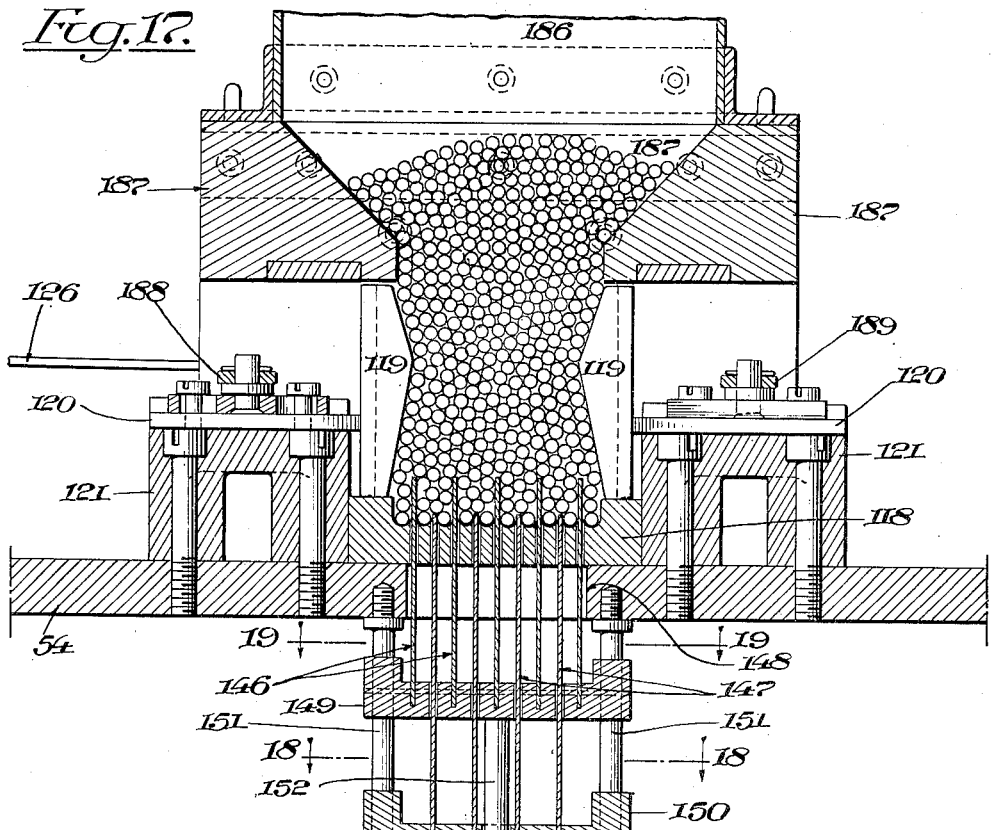
Fig. 17.
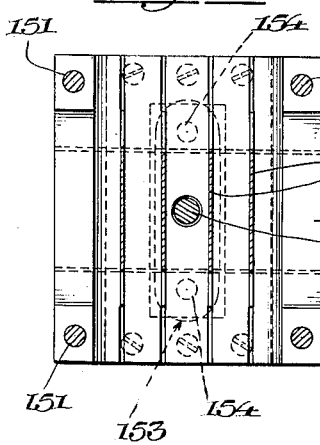
Fig. 18.
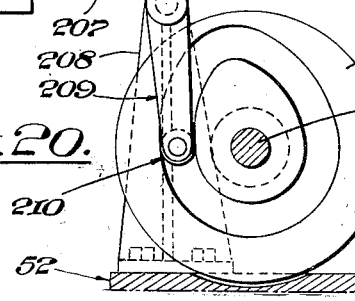
Fig. 19.
Fig. 20.
Inventor
Lucian E. Parker
by his Attorney
John A. Nolan Oct. 16, 1934.  L. E. PARKER  1,977,203
MACHINE FOR MAKING MATCH PACKETS
Original Filed Oct. 28, 1931  25 Sheets-Sheet 15
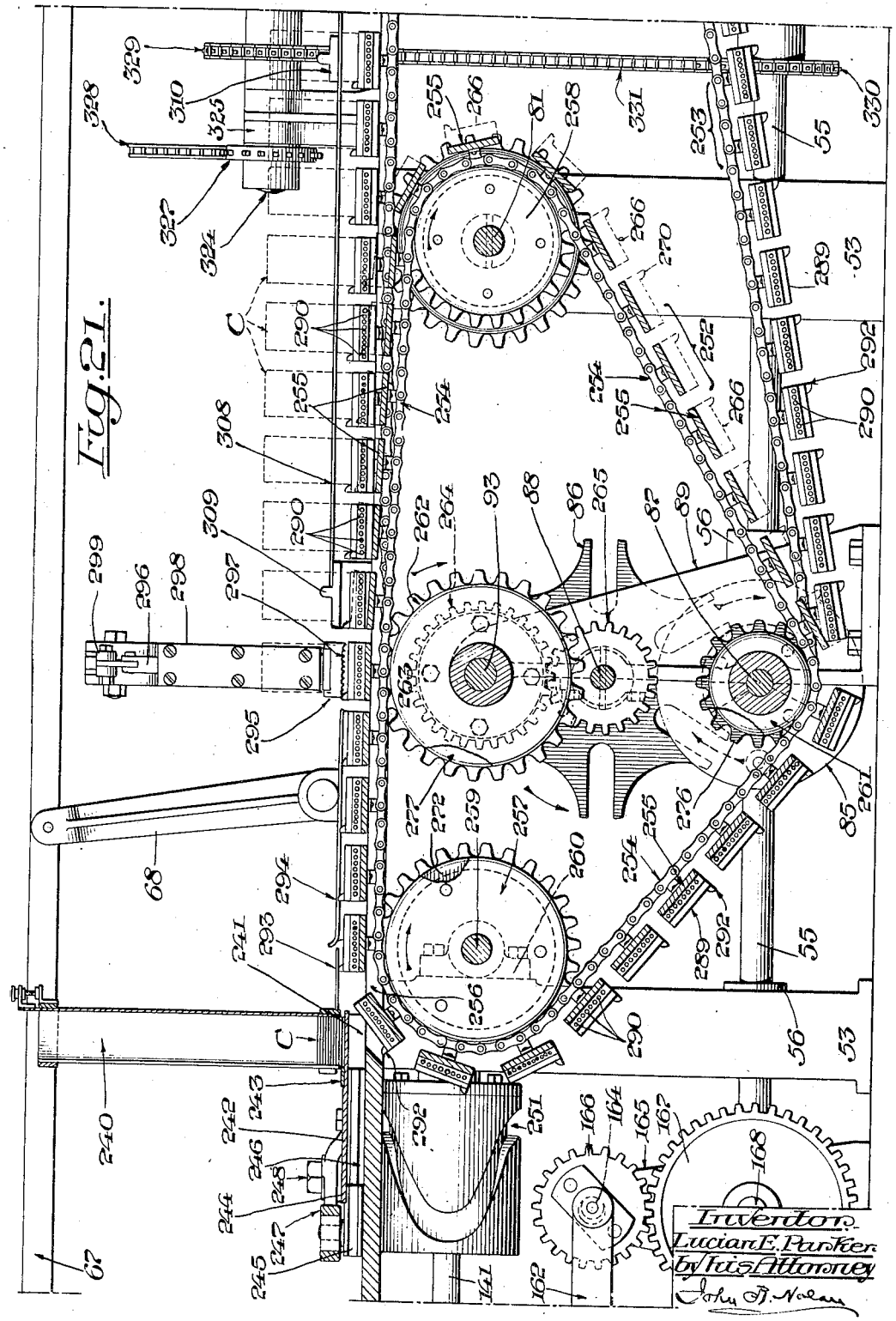

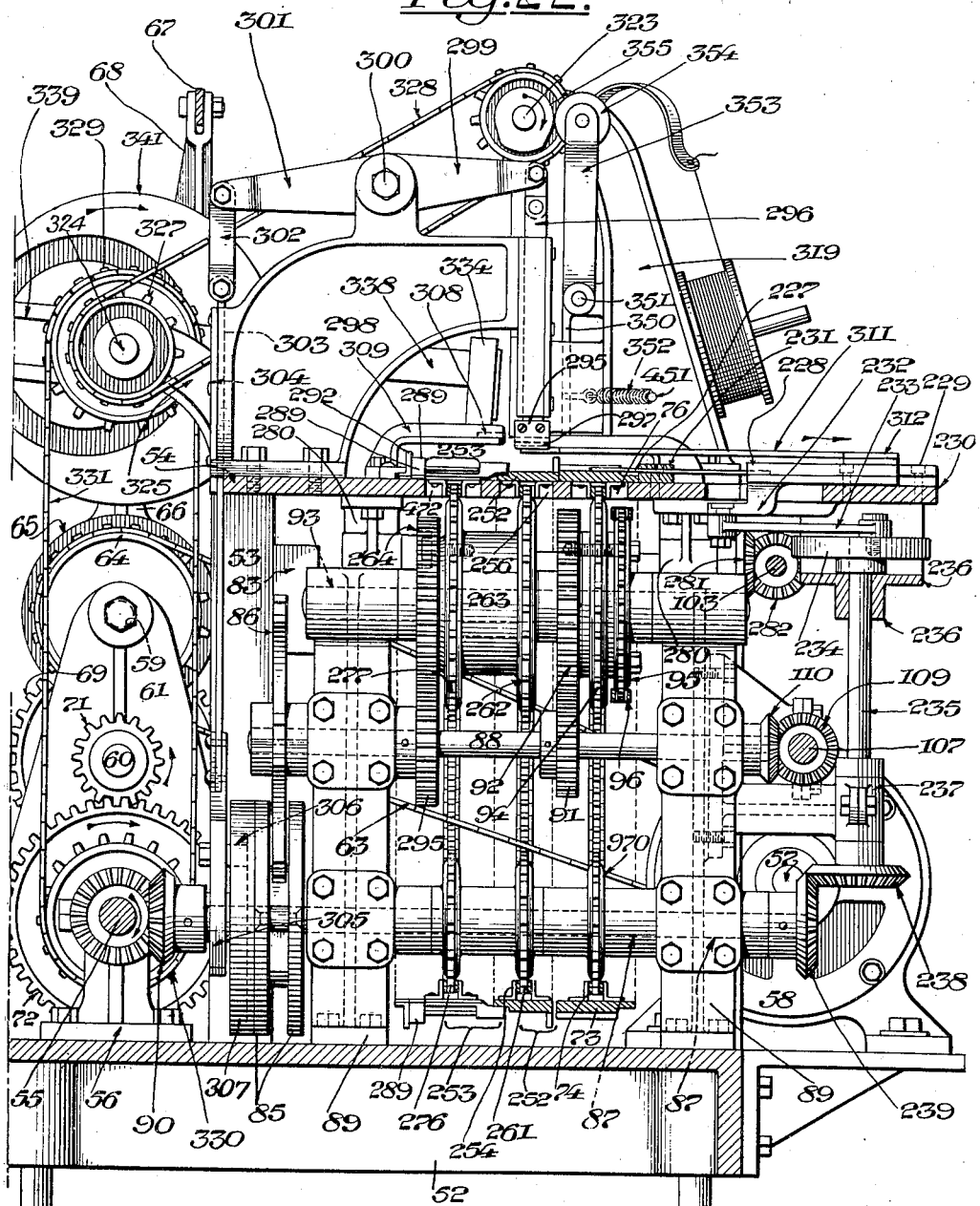

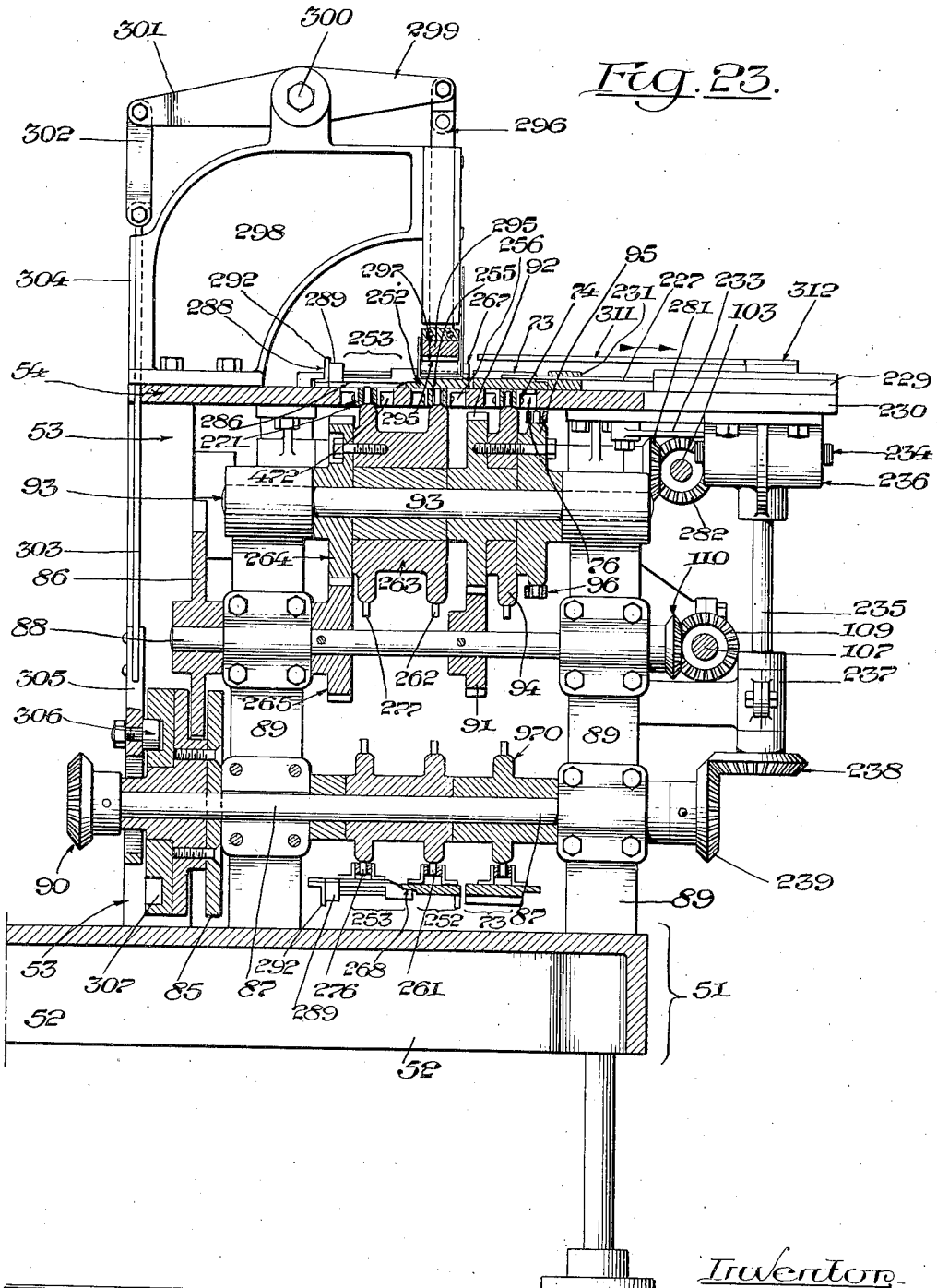

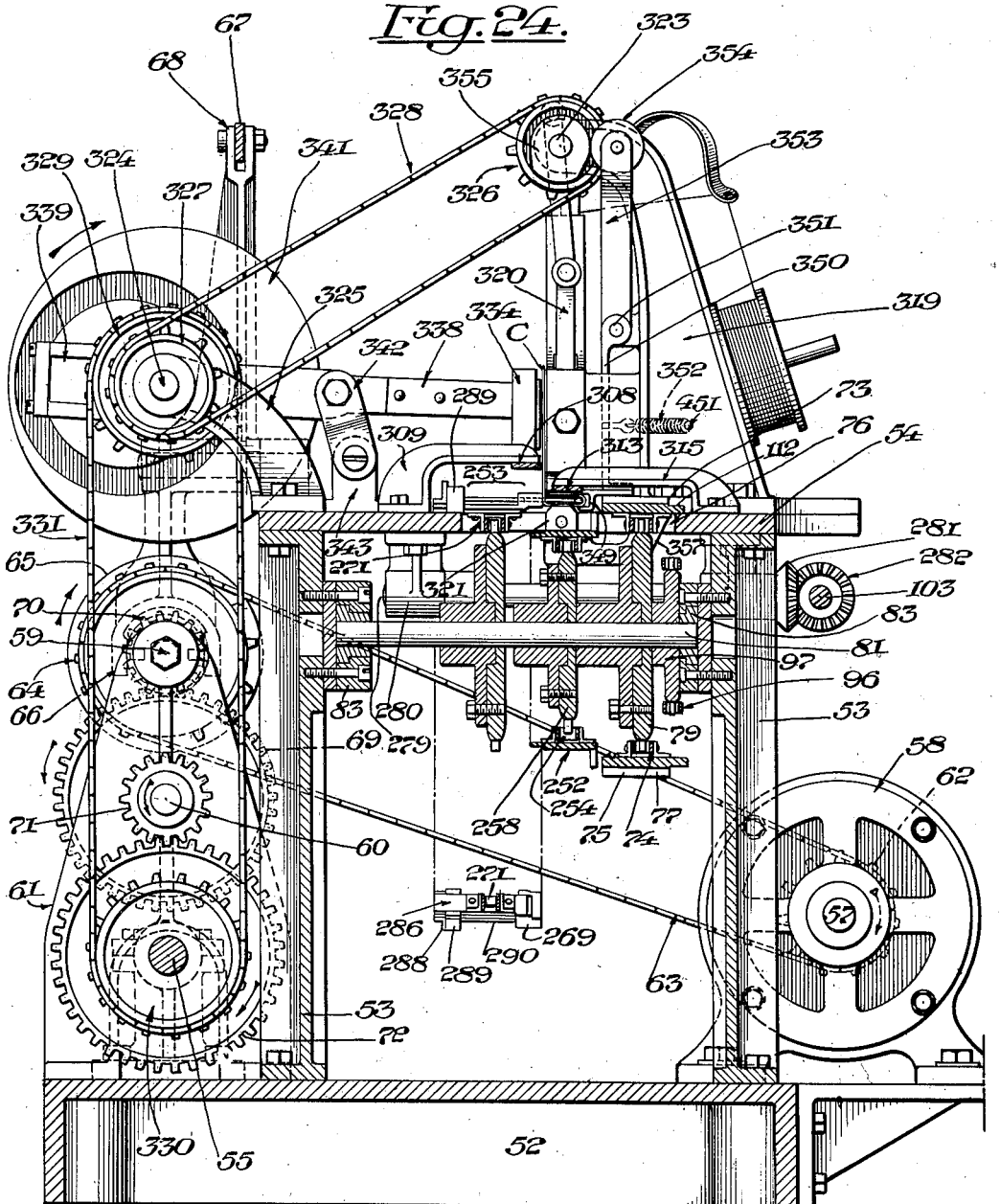
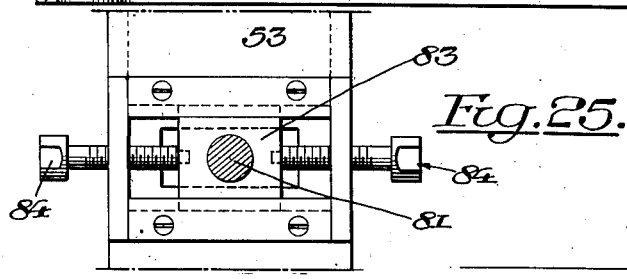

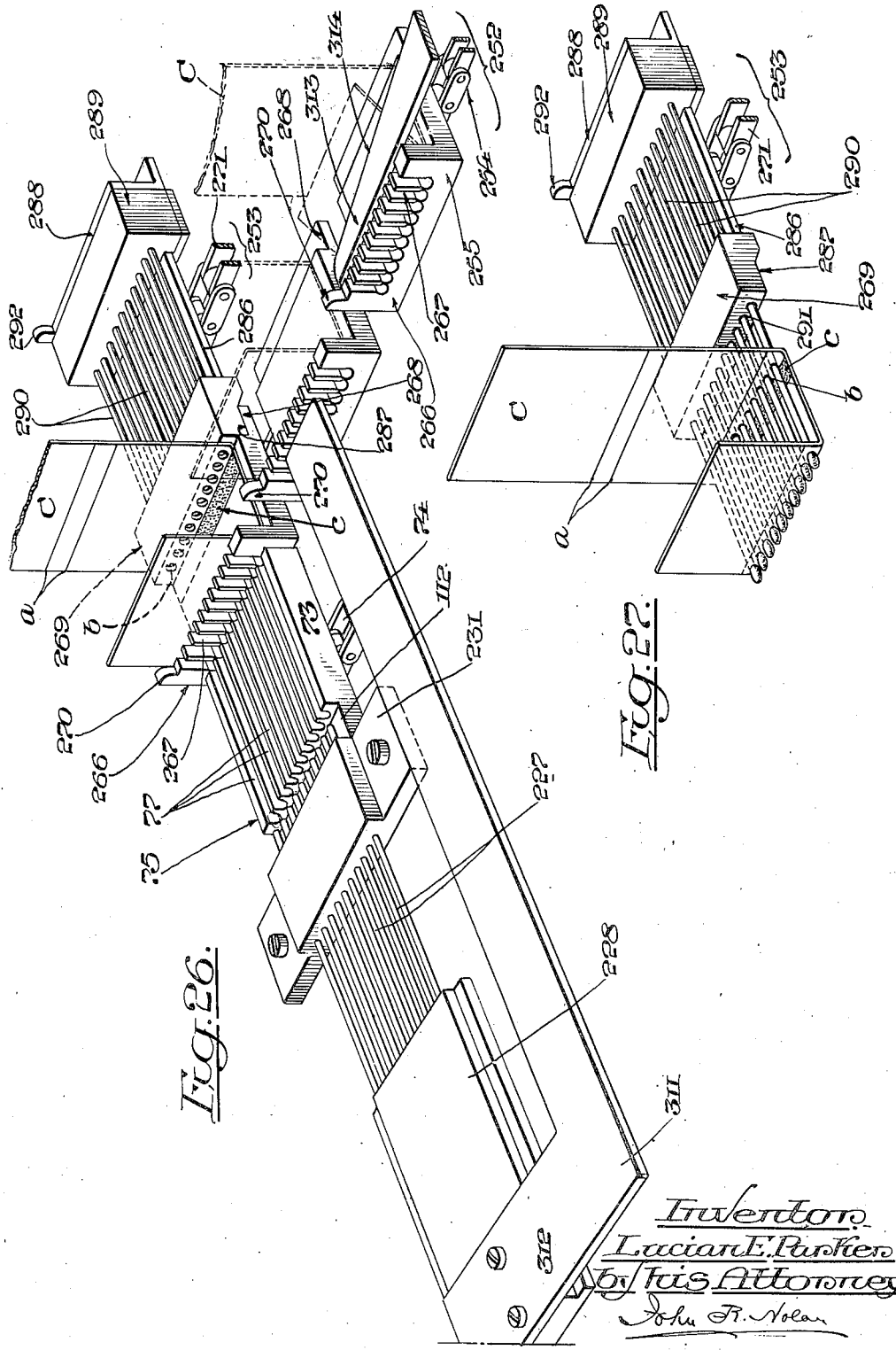

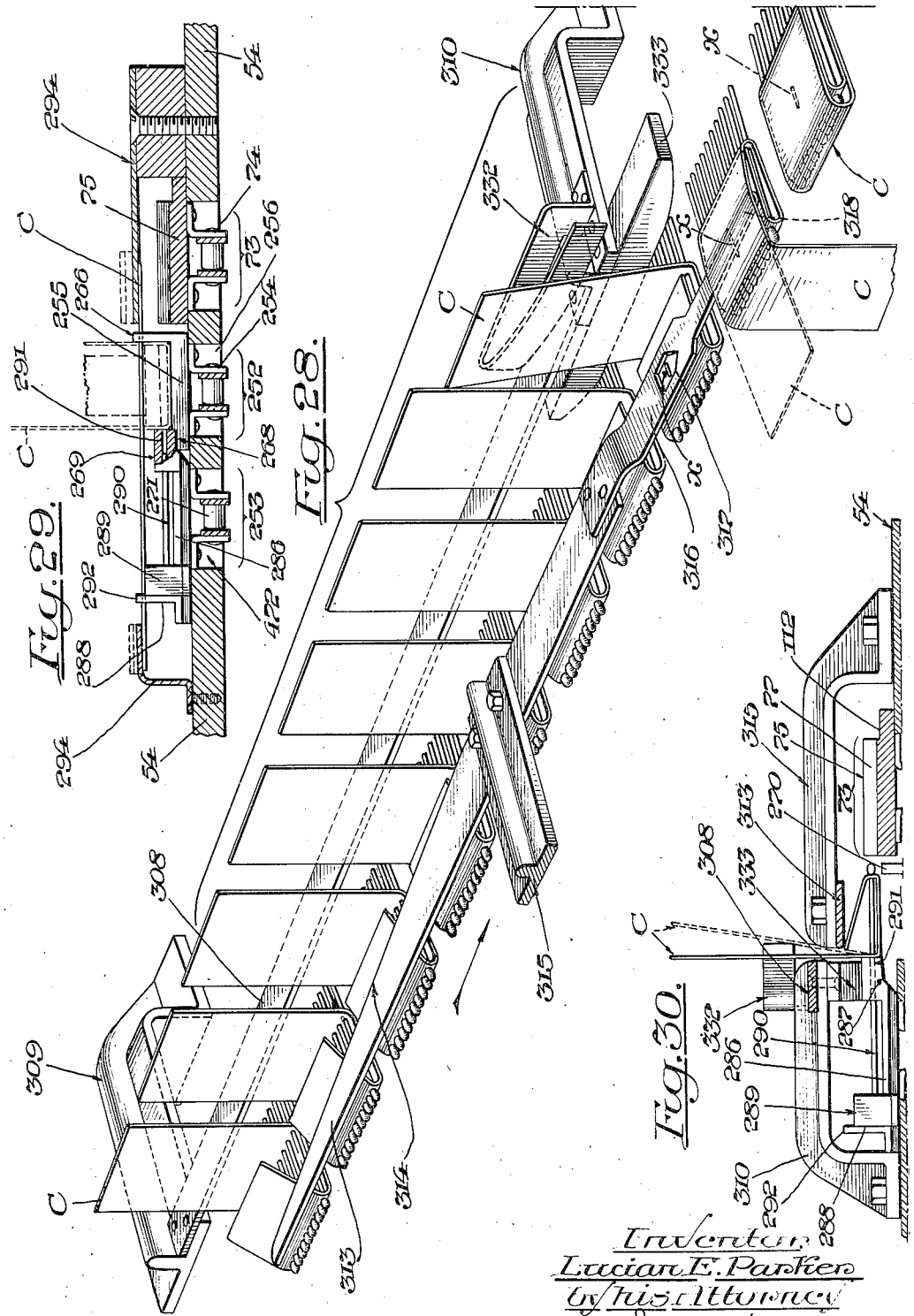

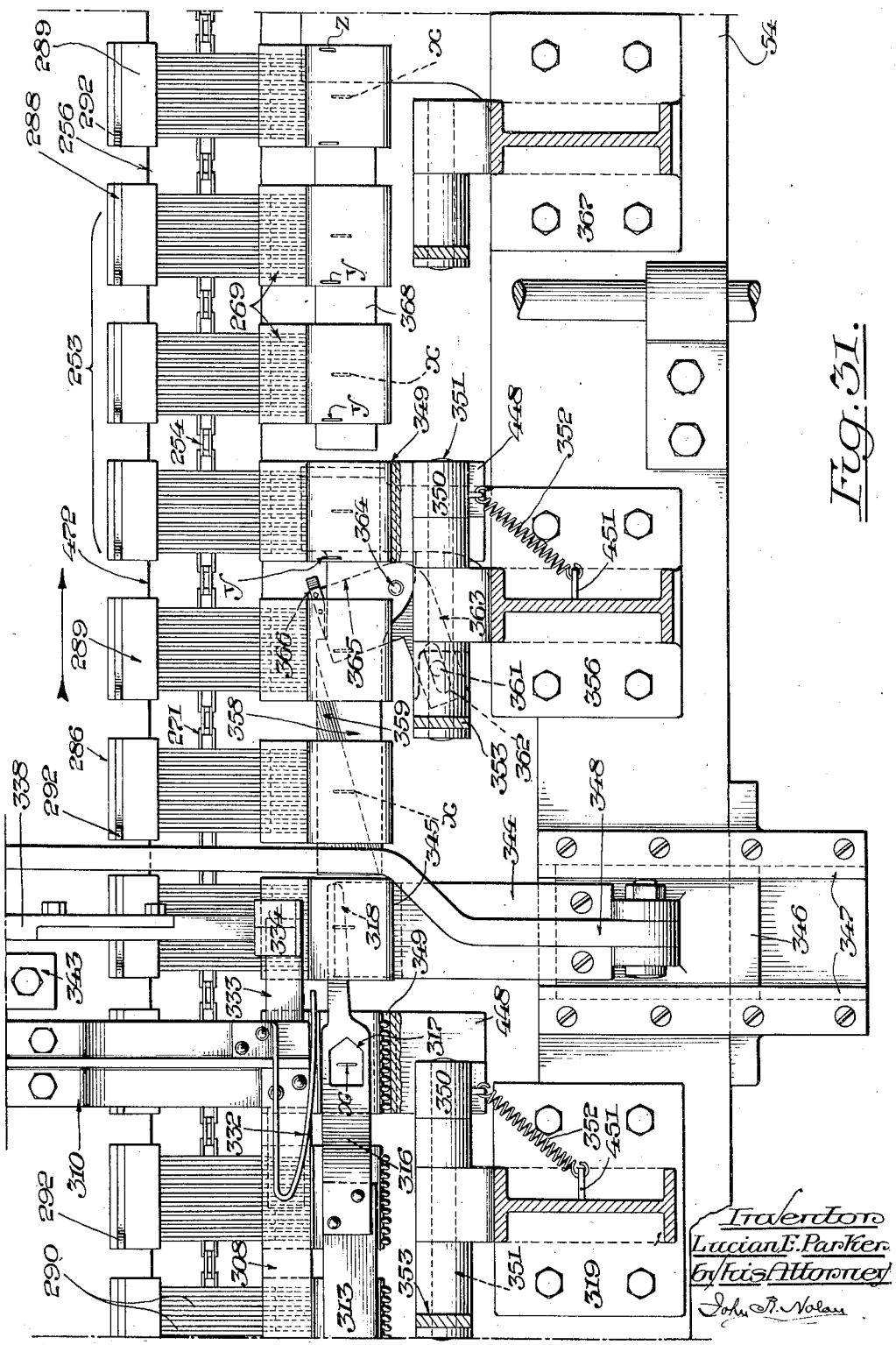

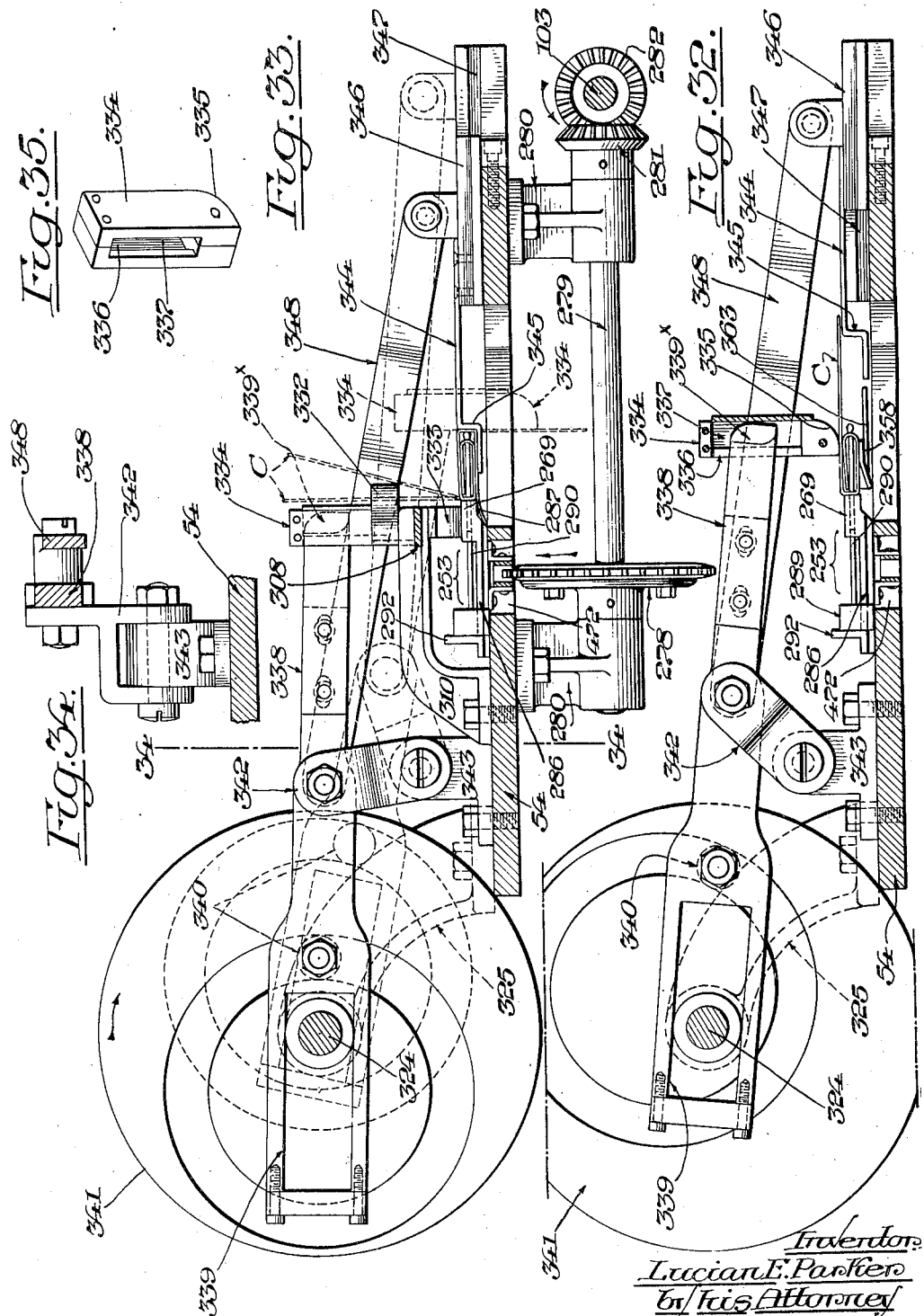

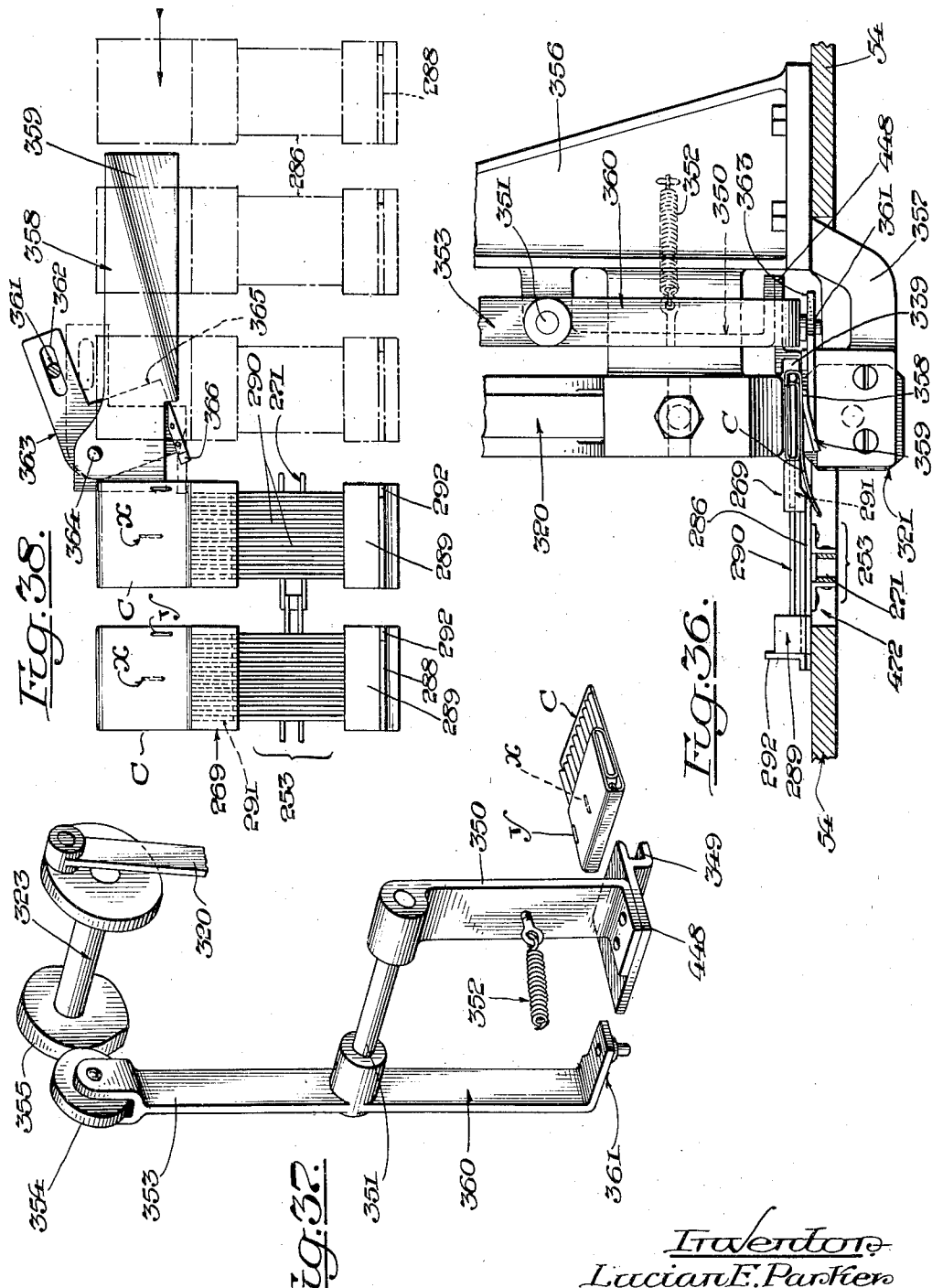

Oct. 16, 1934.   L. E. PARKER   1,977,203
MACHINE FOR MAKING MATCH PACKETS
Original Filed Oct. 28, 1931   25 Sheets-Sheet 24
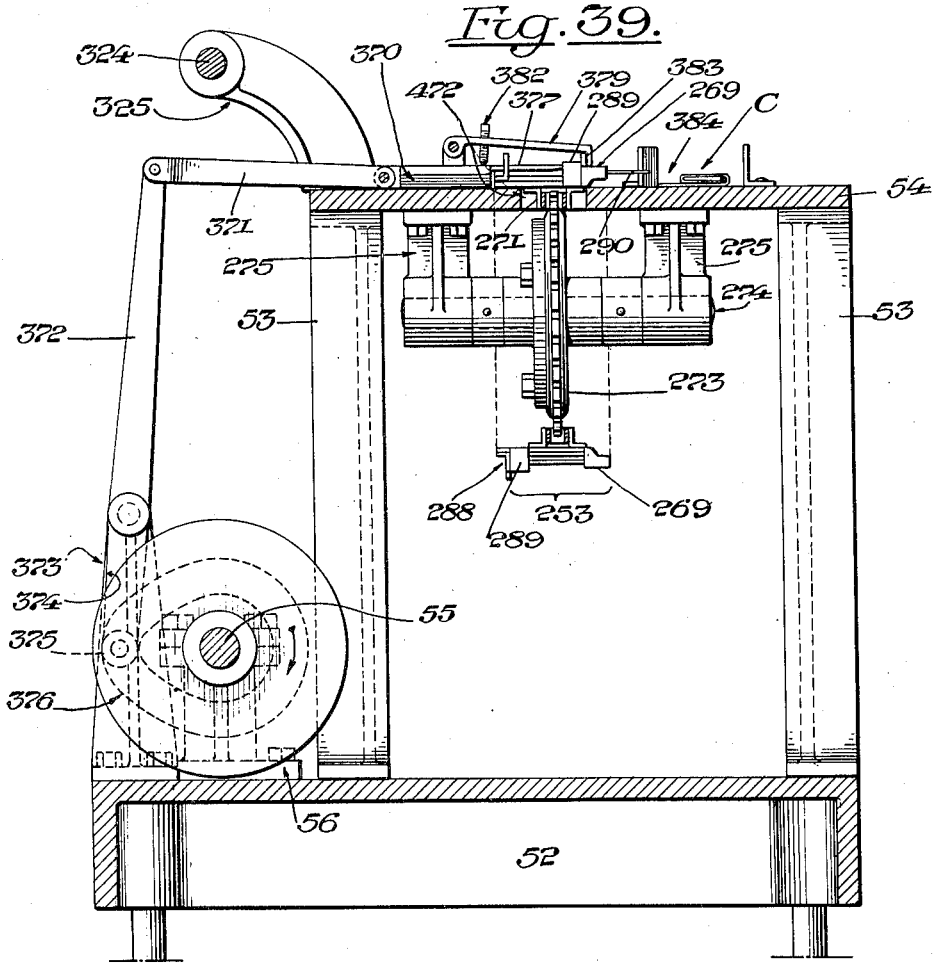
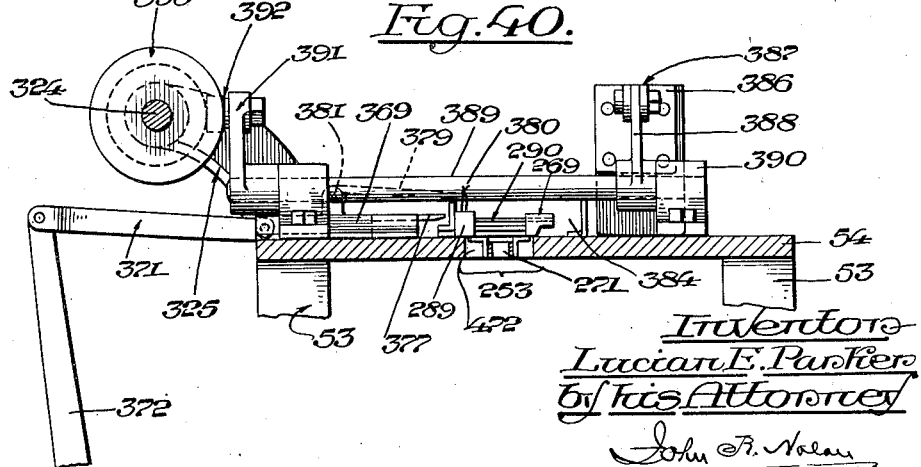

Oct. 16, 1934.  L. E. PARKER  1,977,203
MACHINE FOR MAKING MATCH PACKETS
Original Filed Oct. 28, 1931   25 Sheets-Sheet 25

Inventor
Lucian E. Parker
by his Attorney
John P. Nolan

Patented Oct. 16, 1934

1,977,203

UNITED STATES PATENT OFFICE

1,977,203

MACHINE FOR MAKING MATCH PACKETS

Lucian E. Parker, Wadsworth, Ohio

Application October 28, 1931, Serial No. 571,594
Renewed March 10, 1934

31 Claims. (Cl. 93—7)

This invention relates to a machine for making match packets, having reference more especially to a machine for the production of a match packet wherein a group of matches is contained in a suitable cover having internal ignition material so arranged in spaced relation to the heads of the matches that each individual match may be readily withdrawn from the cover and the match ignited by the frictional contact of its head with the ignition material during the act of withdrawal. A match packet of this character is disclosed in Letters Patent of the United States Nos. 1,694,864 and 1,782,074 dated December 11, 1928 and November 18, 1930, respectively.

The invention concerns certain improvements in a known match packeting machine, which machine comprises, amongst other things, an intermittently-movable match conveyer having a succession of corresponding match holders, each adapted to receive and support a prescribed number of matches arranged in parallelism and with their heads pointing in the same direction; a match supply hopper and mechanism associated therewith for transferring a row of matches to each succeeding holder; a cover-blank supply hopper adjacent the path of the filled holders and mechanism for removing each succeeding blank from the hopper; means for cupping the removed blank so that it presents a bottom portion having long and short upstanding flaps; means for pushing a row of matches from a holder into and through the upstanding flaps of the blank in such manner that the heads of the matches bear exteriorly against the short flap and the tails of the matches project beyond the long flap; means for folding the short flap down upon the match splints, and means for folding the long flap upon the folded short flap, bending the projecting portion of the long flap against the heads of the matches and reversing such portion under and against the bottom of the blank, together with means whereby a metal fastening bale is formed and applied before the folding of the long flap, so as to extend transversely of the short flap, and, whereby upon the final folding of the long flap, the ends of the bale are bent and clinched upon the opposing edges of the cover material so as to secure the parts in folded condition and maintain the internal ignition surfaces of the cover in close contact with the interposed matches.

The object of the present invention is to improve the said machine in certain particulars hereinafter appearing whereby the match packets can be more rapidly and economically produced than heretofore.

The main features of the invention comprise mechanism whereby several groups of matches are simultaneously delivered to spaced-apart holders of the match conveyer during each dwell of the conveyer, the plural delivery points for the matches being so spaced in relation to the train of holders that each succeeding holder carries a group of matches when it passes beyond the supply mechanism; supplemental match supply mechanism arranged in co-operative relation to the path of the match conveyer whereby in each dwell of the conveyer a match or matches is or are supplied to a vacant groove or grooves, if any, in a match holder positioned at the supplemental mechanism; cover carrying and cupping mechanism including two associated conveyers arranged in juxtaposition to the match conveyer, and constructed to provide a succession of former elements in which the cover blanks are cupped preparatory to the transfer of the matches thereto from the holders, and one of said two conveyers being constructed to support the filled cover blanks and transport them through an extended operating path; flap folding mechanism arranged in co-operative relation to the extended conveyer path; flap fastening mechanism arranged in co-operative relation to the flap folding mechanism whereby the short flap of each cover is fastened in place before the long flap is folded and whereby the long flap when folded, together with the short flap, is fastened in place, and mechanism whereby the finished packets are efficiently removed from their conveyer.

The invention also comprises novel features of construction and combinations of parts which will be hereinafter described; the scope of the invention then being expressed in the appended claims.

In the drawings—

Figures 1, 2 and 3 are succeeding views of the complete machine in front elevation; Fig. 1 showing the main and supplemental match-supply hoppers and the mechanisms associated therewith; Fig. 2 showing the cover supply hopper, the cover cupping devices, the first cover folding devices, the first stitcher, and associated mechanisms, and Fig. 3 showing the second and third stitchers, the packet discharge devices, and associated mechanisms.

Figs. 4, 5 and 6 are plan views of the mechanisms shown in Figs. 1, 2 and 3, respectively.

Fig. 7 is a rear elevation of the mechanisms shown in Figs. 2 and 5.

Fig. 8 is a similar elevation of the mechanisms shown in Figs. 3 and 6.

Fig. 9 is a transverse vertical section through the main match-supply hopper, as on the line 9—9 of Fig. 1.

Fig. 10 is a partial longitudinal vertical section in a plane through the said hopper, as on the line 10—10 of Fig. 9.

Fig. 11 is a perspective view of slide block connections for agitating the outlet walls of the hopper.

Fig. 12 is a plan of the supplemental hopper and the mechanism associated therewith for supplying matches to vacant grooves in the holders of the match conveyer, a portion of such conveyer being shown.

Fig. 13 is a transverse vertical section in a plane through the supplemental hopper, as on the line 13—13 of Fig. 12, showing two of the match transfer plungers as advanced beneath the hopper to supply matches to vacant grooves of the adjacent match holder.

Fig. 14 is a sectional plan, in a plane directly above the supporting table, as on the line 14—14 of Fig. 13.

Fig. 17 is a longitudinal vertical section in a plane through the supplemental match-supply hopper, as on the line 17—17 of Fig. 13.

Figs. 18 and 19 are horizontal sections through vertically reciprocating blades for agitating the mass of matches supported at the bottom of the supplemental hopper, as on the lines 18—18 and 19—19 of Fig. 17.

Fig. 20 is a detail of a cam and a portion of an adjacent lever arm actuated thereby included in the mechanism for moving the match transfer plungers in respect to a grooved match supporting member at the bottom of the supplemental hopper.

Fig. 21 is a longitudinal vertical section in a plane through the cover-supply hopper, the cover conveyer, and associated mechanisms, as on the line 21—21 of Fig. 5.

Fig. 22 is a transverse vertical section of the machine in a plane laterally of the intermittent drive mechanism for the conveyers and through the plungers for transferring each succeeding group of matches from the match conveyer to a cupped cover in the cover conveyer, as on the line 22—22 of Fig. 5.

Figure 2:
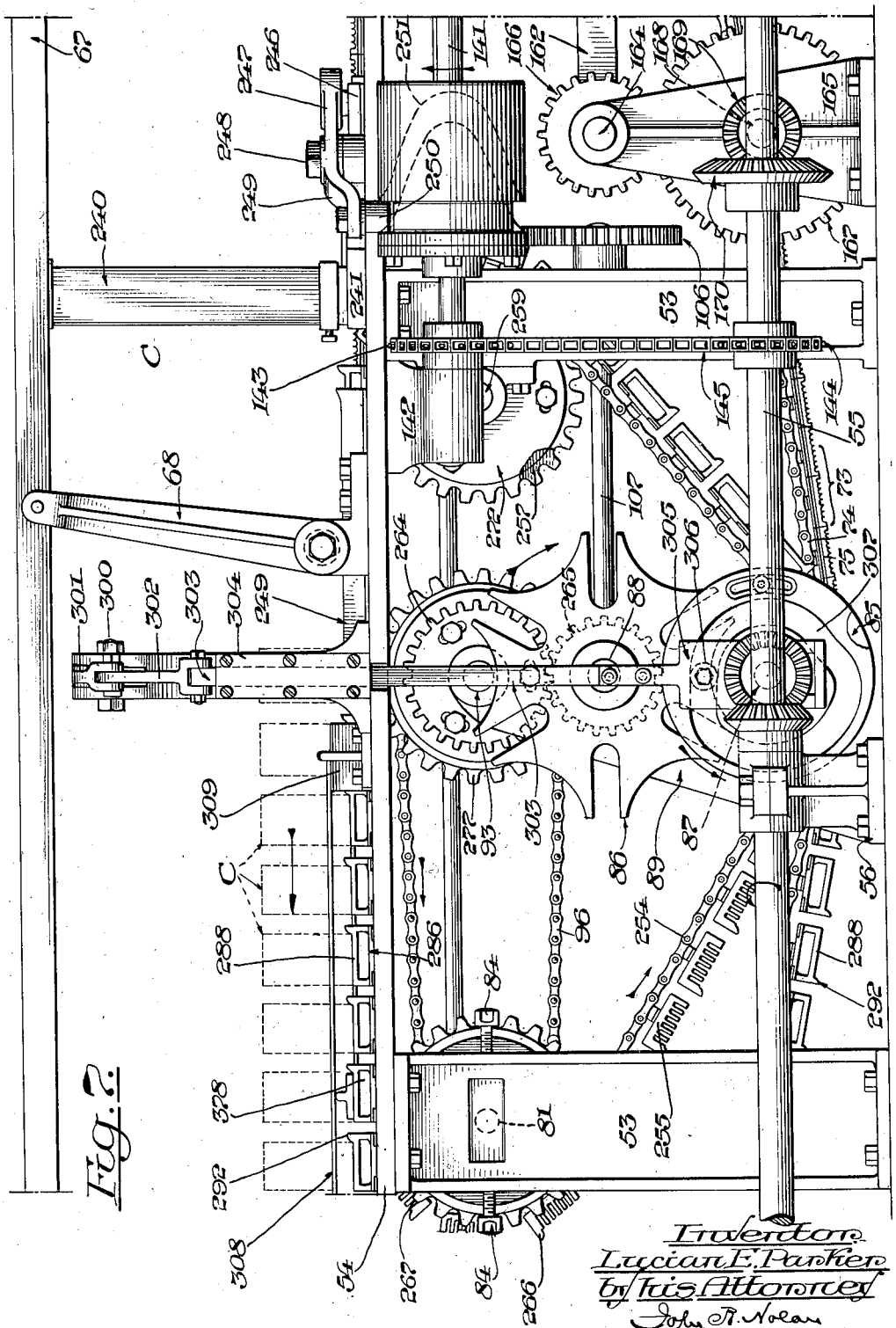
Figure 15:
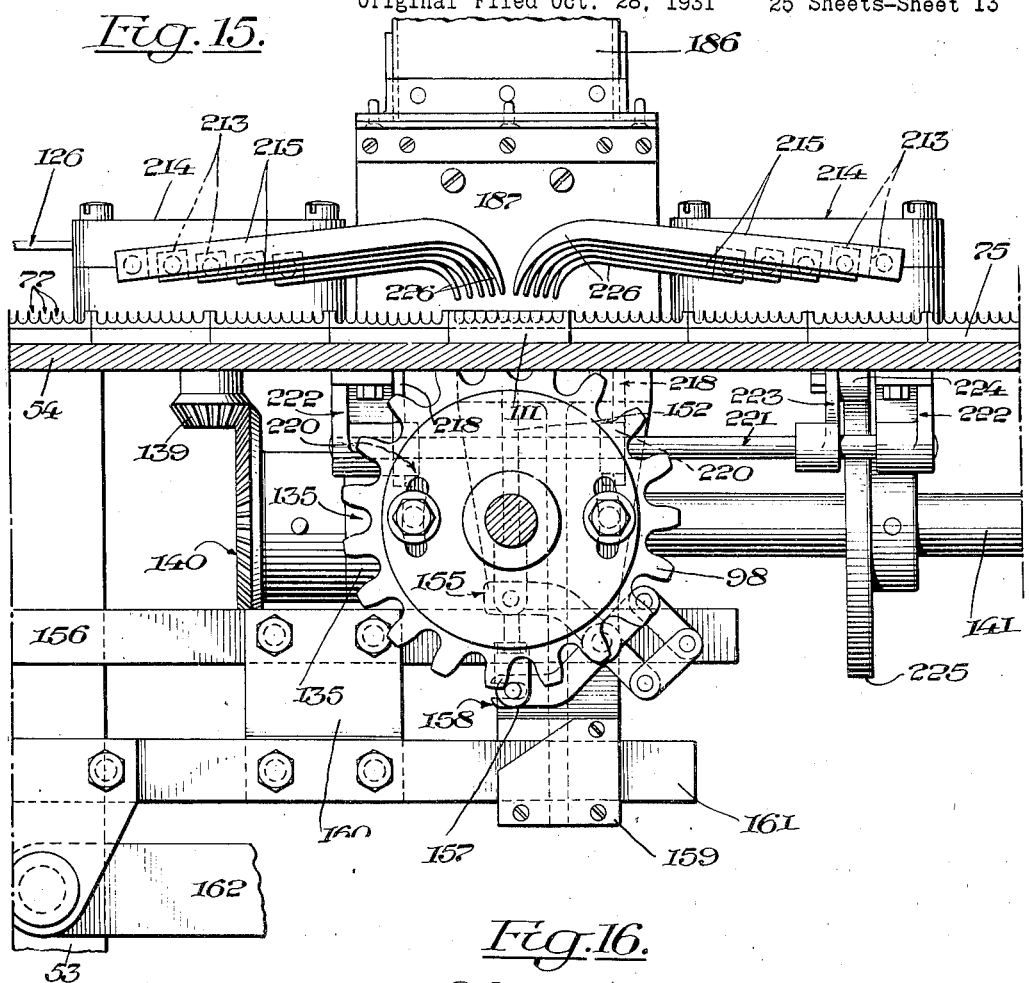
Fig. 15 is a longitudinal vertical section in a plane at the front of the match conveyer adjacent the supplemental match-supply hopper, as on the line 15—15 of Fig. 13.
Figure 16:
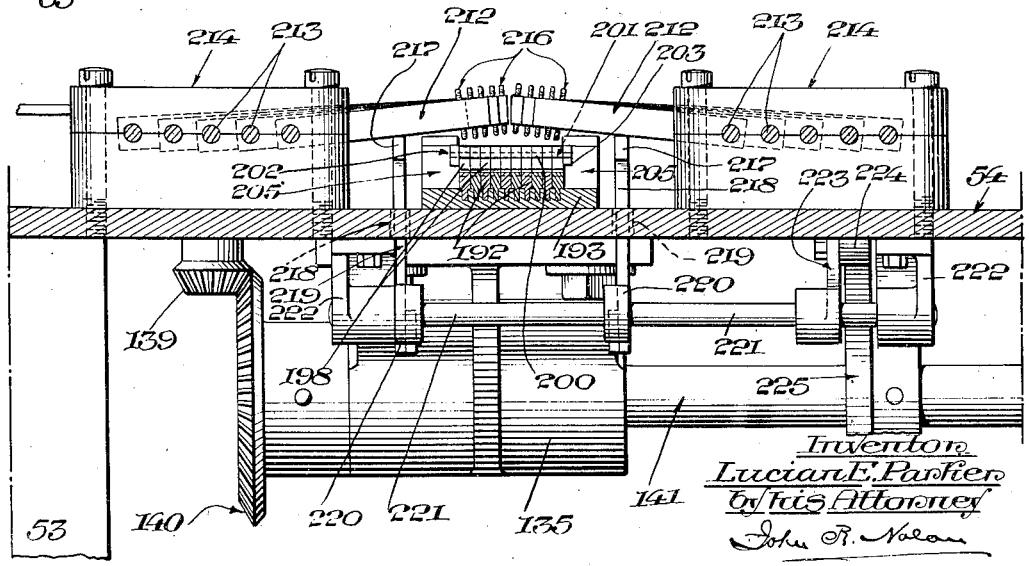
Fig. 16 is a similar section in a plane at the rear of the supplemental match-supply hopper, as on the line 16—16 of Fig. 12.

Fig. 23 is a similar section in a plane through the said drive mechanisms, as on the line 23—23 of Fig. 2.

Fig. 24 is a similar section of the machine in a plane through the conveyers and the respective supporting sprocket wheels therefor adjacent the first stitcher, as on the line 24—24 of Fig. 5.

Fig. 25 is a detail of one of the adjustable boxes for the shaft which carries the said sprocket wheels.

Fig. 26 is a skeleton perspective view of associated portions of the match, cover, and punch conveyers, respectively, showing a cupped cover blank seated in the cover conveyer, and showing also the plungers for transferring the matches from the match conveyer to the cupped cover blank.

Fig. 27 is a perspective view of one of the punch elements of the punch conveyer, showing the matches as inserted through the cupped cover and supported at their tail ends in a perforated wall of the punch element.

Fig. 28 is a similar view of the devices for gradually folding the short upstanding flaps of the covers as the associated covers and matches progress with the plunger conveyer to the first stitcher, showing also the supporting rail for the long upstanding flaps of the covers, together with the yielding backer member for each of the latter flaps in the vicinity of the first stitcher.

Fig. 29 is a transverse vertical section through the table and the respective conveyers, and adjuncts, as on the line 29—29 of Fig. 5, showing a cover blank as deposited flatwise on the plunger and cover conveyers.

Fig. 30 is a similar section in a plane through the folding blade for the short flaps of the covers and adjacent the yielding backer member for the long flaps, as on the line 30—30 of Fig. 5, a partially folded cover and its matches being shown.

Fig. 31 is a sectional plan through the bases of the series of stitchers, showing the adjacent portion of the plunger conveyer and the match packets supported thereby, together with the mechanism for making the second and final cover folds and the devices for positioning each succeeding packet at the second stitcher.

Fig. 32 is a transverse vertical section through the table adjacent the mechanism for making the second and final cover folds, showing the parts in their relative positions upon the formation of the second fold.

Fig. 33 is a similar section, showing the parts in their relative positions, immediately upon the completion of the final fold.

Fig. 34 is a section, as on the line 34—34 of Fig. 33.

Fig. 35 is a detail in perspective of the ironing head of the folding mechanism.

Fig. 36 is a transverse vertical section through a portion of the table adjacent the second stitcher, showing co-acting presser devices for accurately positioning the packet in respect to the stitcher.

Fig. 37 is a perspective view of cam and lever means for relatively actuating the presser devices.

Fig. 38 is a plan of one of the presser elements and a flap-supporting bevelled plate on which it is mounted, showing the adjacent portion of the plunger conveyer and match packets thereon.

Fig. 39 is a transverse vertical section through the machine in a plane through the punch conveyer and its packet discharging end, as on the line 39—39 of Fig. 6, the punches being shown in ejecting position.

Fig. 40 is a similar section through the table adjacent the mechanism for operating the discharge punches, as on the line 40—40 of Fig. 6.

Figure 41:
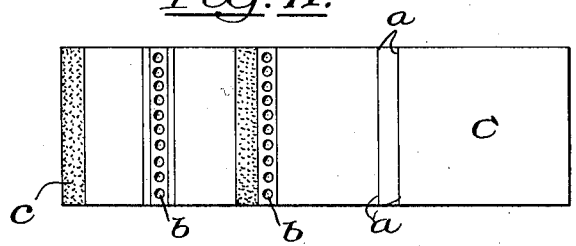

Fig. 41 is a view of a scored and perforated cover blank with suitably disposed stripes of ignition material thereon.

Figure 42:
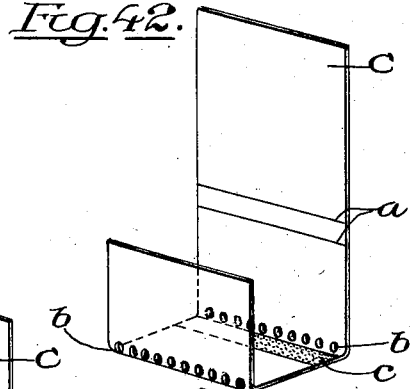
Figure 44:
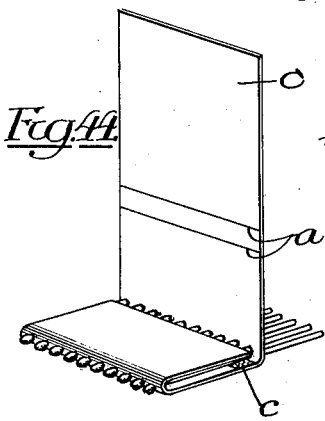
Figure 45:
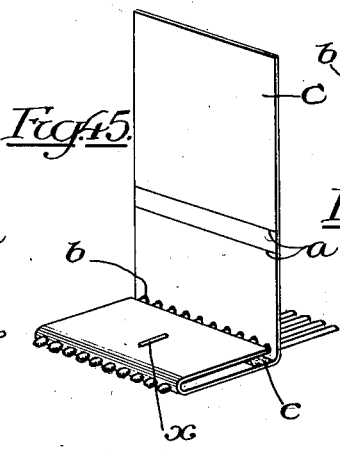
Figure 43:
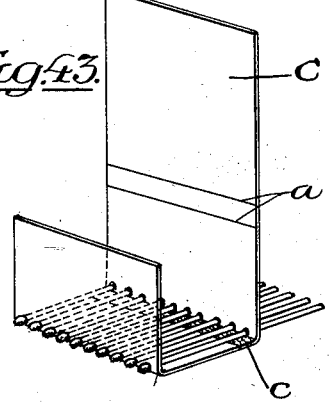
Figure 46:
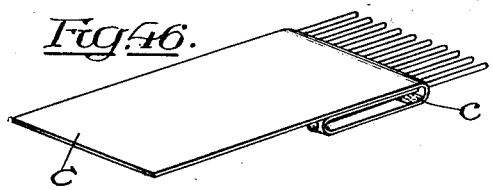

Figs. 42 to 50, inclusive, illustrate the succeeding steps in the formation of the packet; Fig. 42 showing the blank as cupped to provide a bottom portion having relatively short and long upstanding flaps perforated along their basal edges; Fig. 43 showing a group of parallel matches corresponding with and inserted through the perforations of the flaps; Fig. 44 showing the short flap folded upon the match splints; Fig. 45 showing such flap centrally stapled longitudinally between the splints to the bottom portion of the cover; Fig. 46 showing the long flap bent over upon and projecting beyond the short fold; Fig.

Figure 48:
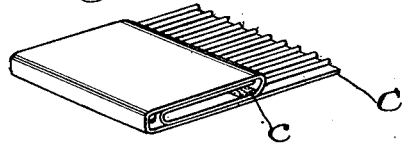
Figure 49:
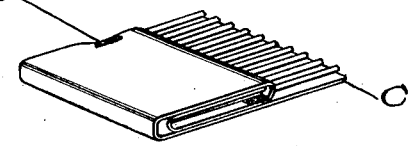
Figure 50:
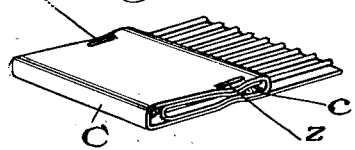

47 showing such projecting portion of the long fold bent downwardly and against the opposing heads of the matches; Fig. 48 showing the depending portion folded back under and against the bottom of the cover; Fig. 49 showing the several folds of the cover stapled together adjacent one edge of the packet, and Fig. 50 showing the folds stapled together at the opposite side of the completed packet.

Referring to the drawings, 51 designates a suitable supporting frame comprising a bed 52, standards 53 and a table 54.

55 designates the main shaft extending longitudinally of the machine, at the rear of the main frame, and having its bearings in suitably-disposed standards 56 on the bed.

In the present instance this shaft is driven through suitable connections from the shaft 57 of an electric motor 58, which connections include a pair of short parallel shafts 59, 60 having their bearings in standards 61 on the bed. Fast on the motor shaft 57 is a sprocket wheel 62 which is connected by means of a chain 63 with a similar wheel 64 on the shaft 59, which latter shaft has a suitable clutch 65 and actuating lever 66 whereby the wheel 64 can be rendered fast or loose as desired. This lever is pivotally connected to a longitudinally-extending shift lever 67 which is connected to pivoted supporting arms 68 on the table. The shaft 60 has fast thereon at one end a gear 69 in mesh with a gear 70 on the shaft 59; and the opposite end of said shaft 60 has also a gear 71 thereon in mesh with a gear 72 fast on the main shaft. (See Figs. 3, 8, 22 and 24.)

73 designates a conveyer comprising an endless chain of links 74 and a continuous succession of match holders 75 supported thereon. The upper horizontal run of the chain is mounted and arranged to travel in a longitudinal slot 76 in the table while the holders on such run are slidably supported on the top of the table. These holders preferably comprise rectangular metal plates having in their outer surfaces a prescribed number of parallel match-receiving grooves 77 which extend transversely of the path of the plates, the grooves in each plate corresponding in number and relative position with a group of matches to be packeted.

At the ends of its horizontal run the chain is flexed about sprocket wheels 78, 79 which are respectively fast and loose on suitably disposed transverse shafts 80, 81, mounted directly under the table. The shaft 80 is fixed in brackets 82 at the receiving end of the table, and the shaft 81 is supported in blocks 83 which are slidably mounted in a pair of the supporting standards 53 and are adjustable longitudinally of the table by suitable screws 84. (See Figs. 24 and 25.) The shaft 81 is intermittently rotated by the sprocket wheel 79 in a manner to impel the chain uniformly step-by-step and present the grooved plates 75 on the upper run thereof in proper order to various co-ordinated instrumentalities hereinafter described.

The mechanism illustrated for intermittently rotating the shaft 81 includes a Geneva stop motion, whereof the members 85, 86 are fast on lower and upper transverse shafts 87, 88, respectively, which have their bearings in standards 89 at the respective sides of the main frame. The lower shaft 87 is driven from the main shaft 55 through co-acting bevel gears 90 on the respective shafts. The shaft 88 has fast thereon a gear 91 in mesh with a gear 92 loose on a third transverse shaft 93 which is fixed in the standards 89. The gear 92 has formed on or secured to it two sprocket wheels 94, 95 whereof one (94) meshes with the chain 74, and whereof the other (95) is operatively connected by means of a chain 96 with a sprocket wheel 97 fast on the shaft 81. (See Figs. 2, 7, 21, 22 and 23.) The lower run of the match conveyer 73 passes about a sprocket wheel 97O loose on the shaft 87.

By this construction the shaft 83 is intermittently rotated from the shaft 87 through the Geneva device; the intermittent motion is transmitted from the shaft 88 through the gear 91 to the gear 92 and its sprockets 94, 95, and such motion is transmitted from the sprocket 95 to the shaft 81 through the chain 96 and sprocket 97, thereby advancing the match conveyer uniformly step-by-step.

To insure the steady and uniform movement of the horizontal run of the match conveyer along the table, a series of intermittently-rotatable sprocket wheels 98 are mounted below the table to mesh with the links of such run at intervals throughout its length. These wheels are fast on transverse shafts 99 which have their bearings in depending brackets 100 on the table 54 and are provided with bevel gears 101 in mesh with similar gears 102 on a longitudinally extending shaft 103 having its bearings in suitably disposed brackets 104 on the main frame. The shaft 103 has fast thereon a gear 105 in mesh with a gear 106 on one end of a lower parallel shaft 107 which has its bearings in boxes 108 on the adjacent standards 53 and 89. The other end of the shaft 107 extends adjacent the shaft 88 on which the driven element 85 of the Geneva stop motion is mounted and carries a bevel gear 109 in mesh with a similar gear 110 on the shaft 88. Hence the intermittent motion is transmitted from the shaft 88 to the shaft 107, thence through the gearing 105, 106 to the shaft 103, and thence through the bevel gearing 101, 102 to the sprocket wheels 98, which accordingly impel the upper run of the match conveyer. (See Figs. 1 and 2.)

During the intermittent travel of the upper run of the match conveyer, groups of parallel matches, with their heads pointing in the same direction, are inserted in the grooves of the match holders at the receiving end of the conveyer, which holders thus transport the groups along the table. Several groups of matches are simultaneously delivered to spaced-apart holders 75 during each dwell of the conveyer, the plural deliveries for the matches being so spaced in relation to the train of holders that each succeeding holder carries a charge of matches when it passes beyond the match supply means when the machine is in operation.

Stationary blocks 111 properly positioned on the table at the front of the upper run of the match conveyer serve as aligning stops for the heads of the matches when they are transferred to the conveyer. The forward edges of the respective match holders 75 are formed with plane reduced portions 112 which are slidable under and guided by the correspondingly formed sides of the adjacent holders. (See Figs. 1, 4 and 9.)

The means herein illustrated for supplying the matches and delivering them in regular groups to the match conveyer is as follows:

Supported on the table adjacent to and parallel with the receiving end of the upper run of the match conveyer is a hopper or magazine 113 (Figs. 1, 4, 9 and 10) adapted to contain a mass of matches arranged in substantial parallelism and with their heads disposed at the front wall of the hopper. The base of the hopper comprises a bed 114 which is supported above and in spaced relation to the table by means of suitable brackets 115, and which bed has formed therein a series of equally-spaced funnel-like outlets 116 through each of which matches are delivered and a row thereof deposited in parallel grooves 117 in the upper surface of a match supporting block 118 which is fixed on the table 54 adjacent the longitudinal edge of the upper run of the conveyer. The grooves of each block 118 correspond in number and relation to and are in horizontal alignment with the grooves of a match holder 75 during each dwell of the match conveyer, thus enabling the row of matches contained in the block to be pushed endwise into the grooves of the holder, as will be hereinafter explained.

The space through which the matches pass on their way from each outlet to the underlying block 118 is flanked by vertical side walls 119 having their inner or acting surfaces oppositely bevelled to afford a slightly constricted passage for the mass of matches, as seen in Fig. 10. Horizontal reciprocations of small amplitude are imparted to the opposite walls, so as to move them toward and from each other, thus causing the bevelled surfaces of the walls to raise and lower the interposed matches and thus contribute to their orderly descent to the block. In the present instance the outer walls of the discharge spaces at the ends of the hopper bed 114 are formed on, or affixed to horizontal slides 120 which are mounted on blocks 121 bolted to the table, and the opposite walls of adjacent spaces are formed with slides 120 which are connected in pairs by bars 122 and are mounted in blocks 123 also bolted to the table.

The outer and middle slides 120 are jointed to corresponding rocker-arms 124, 125, respectively, which are pivotally mounted on the table and are also connected by a link bar 126 so as to be movable in parallelism. The remaining slides 120 are pivoted to the forward arms 127 of levers which are fulcrumed on the table, as at 128, the other arms of such levers being pivoted to the link bar. (See Figs. 1, 4, 9 and 10.) Hence the latter slides 120 are moved concurrently with, but in opposite directions to the outer and middle slides 120, when the link bar is reciprocated, and in consequence the companion slides for each space are together moved toward and from each other in a manner to agitate the interposed body of matches as previously mentioned.

One of the rocker-arms 124 comprises one of the members of a lever whereof the other member 129 is pivotally connected through a link 130 with a slide block 131 which is mounted in the transversely slotted head 132 of a short vertical shaft 133. This shaft has its bearing in a bracket 134 bolted on a bearing bracket 135 projecting from the rear of the table 54. Fast on the shaft 133 is a pinion 136 which meshes with a spur wheel 137 on a vertical shaft 138 also having its bearing in the bracket 134. On the lower end of the shaft 138 is a bevel gear 139 in mesh with a bevel gear 140 on a shaft 141 which extends longitudinally of the table and has end bearings in the bracket 135 and in a similarly projecting bracket 142 on the table. The shaft 141 is continuously driven from the main shaft 55, and for this purpose such shafts have fast thereon sprocket wheels 143, 144, respectively, which are operatively connected by means of a chain 145. (See Figs. 1, 4, 5, 11, 12, 15 and 16.)

By the construction just described it will be seen that during the rotation of the shaft 141 motion is transmitted through the bevel gears 139 and 140 to the shaft 138, and through the gears 136, 137 to the shaft 133 and its slotted head 132, thereby producing limited reciprocating motion of the block in said head and by virtue of the link connection of the block and lever arm 129 rapidly vibrating the latter and reciprocating the link bar 126 for the purpose previously mentioned.

As a means to contribute to the accurate assembling of the matches in the grooves of the supporting blocks 118 the latter are each provided with parallel spacing and agitating blades which are slidably fitted for vertical reciprocation in longitudinal slots alternating with the grooves in the block.

There are two sets (146, 147) of blades for each block, the blades of one set alternating with those of the other set. These sets are reciprocable vertically in opposite directions to each other so as to move into and recede from the mass of matches directly above the block. The two sets of blades depend through a suitably located opening 148 in the table, and are carried by independently reciprocating upper and lower cross-heads 149, 150, respectively, which are slidable on depending guide rods 151 affixed to the table.

The upper head 149 is slotted for the free passage of the blades 147 and is supported by a central vertical rod 152 which depends freely through an aperture in the lower head 150, which latter is provided with a centrally perforated guide member 153 through which the rod extends, and from which member 153 depend a pair of spaced rods 154. The foot of the rod 152 is pivotally connected to one (155) of the crossed levers of a lazy-tongs which is pivotally supported on a longitudinally reciprocative horizontal bar 156 beneath the table.

The lower ends of the rods 154 are pivotally connected by a T member 157 to the companion crossed lever 158 of the lazy-tongs, and therefore when the bar 156 is reciprocated the two levers 155, 158 are forcibly moved toward and from each other, thus raising and lowering the respective sets of blades in a manner to straighten the proximate matches and facilitate their descent into the grooves of the underlying match supporting block 118.

The bar 156, which is slidably mounted in hangers 159 secured to the table 54, extends below the series of match supporting blocks 118, and has similar lazy-tong connections with the supporting heads for the agitating and straightening blades of the respective blocks, thus simultaneously actuating the blades at the various match supply stations. (See Figs. 9 and 10.)

In the present instance the bar 156 is secured by plates 160 to a lower parallel bar 161 which is slidably mounted in the hangers 159, and which latter bar is pivotally connected to one end of a long link 162. The other end of the link is eccentrically connected, at 163, with a shaft 164 which has its bearings in a standard 165 on the main frame. Fast on this shaft 164 is a gear 166 in mesh with a gear 167 on a lower shaft 168 which has its bearings in the standard 165 and is equipped with a bevel gear 169 in mesh with a similar gear 170 on the main shaft 55. (See Figs. 2 and 7.) Hence motion is transmitted from the main shaft to the eccentric shaft 164, thus longitudinally reciprocating the link 162 and the connected bars 161, 156 in a manner to effect the rapid vertical reciprocations of the blades 146, 147, as previously mentioned.

The means herein illustrated for transferring the groups of matches from the supporting blocks 118 to the adjacent holders of the upper run of the match conveyer during each succeeding dwell of the conveyer comprises sets of parallel punches 171 which are mounted rearward of the path of the conveyer and are reciprocative within and longitudinally of the grooves of the respective blocks. The punches in their forward strokes bear against the tails of the match splints and push the matches, heads forward, into the holders of the conveyer. The punches then recede and the conveyer advances one step, whereupon the operation of the punches upon succeeding groups of matches is repeated, and so on.

The punches of each set are carried by a cross-head 172 which is slidably mounted in and between guide bars 173 on the table, the forward or free ends of the punches being supported in a suitably perforated guide bar 174 which is fixed on the table adjacent the match supporting block.

The cross-heads 172 of the respective sets of punches are connected by a bar 175 so as to move as a unit, which bar has secured thereto the forward end of a rearwardly extending slide bar 176 which is guided in a bracket 177 on the table. The rear end of the bar 176 has a guide yoke 178 which embraces a shaft 179 having its bearing in a rearwardly extending bracket 180 on the table. The bar 176 is provided with a laterally-disposed roll 181 operatively fitted in the race of a face cam 182 on the shaft 179, the contour of which race and the speed of rotation of the shaft 179 being such as to effect the reciprocation of the slide bar 176, together with the series of punches, in timed relation to the travel of the match conveyer; that is to say, at the end of each third step of the match conveyer while the latter is at rest, the punches are moved across and retracted from the adjacent match supporting blocks 118, and during the next succeeding three steps of the match conveyer the punches are maintained in retracted position, and so on. Consequently the matches contained in the hopper have ample opportunity to settle in the grooves of the respective match blocks 118 preparatory to the transfer stroke of the punches.

In the present instance the shaft 179 has fast thereon a sprocket wheel 183 which is connected with and driven at the proper speed from a sprocket wheel 184 on the main shaft 55 by means of a chain 185. (See Figs. 1, 4 and 9.)

The match holders 75 and their contained matches are advanced by the conveyer to mechanism whereby vacant grooves, if any, in the holders are efficiently supplied with matches, which mechanism is as follows:

186 designates a supplemental match-supply hopper which is generally similar in construction and operation to the main hopper previously described, save that the base 187 of the hopper is provided with a single outlet. This supplemental hopper is spaced from and is in alignment with the main hopper. A grooved block 118 to support a row of parallel matches is mounted on the table beneath the outlet of the supplemental hopper, and the space between the outlet and the block has movable side walls 119, which are respectively connected by a lever 188 and rock arm 189 to an end extension of the connecting link 126 which actuates the walls 119 of the main hopper. Similarly to the main hopper the grooved block 118 is provided with straightening and agitating blades 146, 147 which are mounted on a pair of oppositely-reciprocating cross-heads 149, 150. These heads are connected with and actuated by crossed levers 155, 158 on the reciprocating horizontal bar 156, thus co-operating similarly to the corresponding elements of the main hopper, to ensure the settling of the matches in parallelism in the associated supporting block 118 laterally of the path of the match holders on the match conveyer. (See Figs. 4, 12, 13, 15 and 17.)

The hopper 186 is so arranged in relation to the path of the match conveyer that in each dwell of the conveyer a match holder thereof is positioned with its grooves in registry with those of the match supporting block 118 beneath such hopper.

A series of parallel punches 190 are so mounted and arranged in rear of the block 118 as to be independently reciprocable in the grooves of the latter, and means controlled by the presence and absence of matches in the grooves of the adjacent holder 75 of the match conveyer are provided whereby any or all of the punches can be actuated to transfer a match or matches from the block to a vacant groove or grooves in the holder, as will presently appear.

The forward ends of the punches 190 are supported and guided in a perforated bar 191 at the rear of the adjacent match supporting block 118 and the rear ends of the punches are respectively secured to a series of independently movable slide bars or jacks 192 which are arranged in close parallel relation in a guide frame 193 on the table. The forward and rearward ends of each jack are provided with upstanding projections 194, 195, respectively, and each jack has also formed in its upper edge a suitable tooth or shoulder 196. The forward projection 194 affords a stop which abuts against a cross-bar 197 on the frame 193 to limit the rearward movement of the jack and its punch. The tooth 196 and the rearward projection 195 are adapted to be engaged under certain conditions by teeth 198, 199 on the respective arms of a pawl lever 200 which is reciprocated toward and from the hopper 186 in each dwell of the match conveyer. The rear arm of the pawl lever is longer and heavier than the forward arm, thus tending to maintain the lever normally in horizontal position with its forward tooth 198 above the tooth or shoulder 196 and its rear tooth 199 upon the upper edge of the jack and in engaging relation to the projection 195.

There are a series of pawl levers 200 corresponding in number with the jacks, which levers are independently mounted on a pivot rod 201 supported in and between a pair of spaced forwardly projecting arms 202 on a plate 203 extending from a horizontally reciprocative slide 204. This slide is mounted in a guide frame 205 at the rear of the table 54 and is connected by means of a link 206 with the upper arm 207 of a lever which is fulcrumed on a standard 208 on the bed 52. The other arm 209 of the lever has a laterally-disposed roll 210 which is entered in the race of a cam 211 fast on the main shaft 55, the contour of the cam race being such that the lever is oscillated and the slide thereby reciprocated during each interval of rest of the match conveyer. (See Figs. 1, 13 and 20.)

The co-operative relation of the parts just described is such that when the jacks 192 and their punches 190 are in retracted position the series of pawl levers are disengaged from the teeth 198 of the respective jacks, and hence such levers are reciprocated idly with the slide 204 while the jacks and punches remain at rest in their retracted position. If, however, one or more of the pawl levers be moved to set its tooth 198 in engaging relation with the tooth or teeth 196 of the adjacent jack or jacks, such jack or jacks will be pushed forward by the advancing pawl or pawls and the punch or punches thus be entered in an opposing groove or grooves of the associated block 118. In the initial back stroke the pawl or pawls are retracted from the tooth or teeth 198 and permitted to resume its or their normal position, thus causing the tooth or teeth 199 of such pawl or pawls to engage the opposing rearward projection or projections 195 of the complementary jack or jacks and return such jack or jacks to the rearward position.

The means for determining the active and inactive positions of the pawl levers in respect to the teeth 198 of their respective jacks, is as follows:

Overhanging the rear portion of the frame 193 are the free ends of two oppositely-disposed groups of arms 212, whereof, in the present instance, each group corresponds in number with one-half of the pawl levers. The opposite ends of the arms 212 of the respective groups are secured to parallel rock-shafts 213 which are journaled in bearing blocks 214 on the table adjacent the respective sides of the hopper 186. These shafts extend to and overhang the path of the match conveyer, and are provided at their forward ends with feelers 215, hereinafter described, which overlie the respective grooves of each match block when it is positioned in front of the hopper.

The free ends of the arms 212 are suitably shaped and arranged to lie in a straight line directly above the forward arms of the respective pawls, and each end is provided with a vertical set-screw 216 which may be adjusted to set its lower end toward and from the opposing pawl lever arm.

The two groups of arms 212 are respectively supported upon the heads 217 of two vertically movable T shaped supports, the shanks 218 of which are slidably fitted in holes 219 in the table. These shanks depend below the table and are pivotally connected to a pair of suitably spaced arms 220 fast on a rocker shaft 221 which is journaled in brackets 222 on the underside of the table. Fast on the shaft 221 is a rearwardly extending arm 223 on the free end of which is a roll 224 that bears on a cam 225 fast on the driven shaft 141, the contour of which cam is such that in an interval of its rotation the roll is lowered and raised, thus effecting through the arms 223 and shaft 221, the periodical lowering and raising of the T shaped supports and the overlying pawl-actuating arms 212. The reciprocation of the supports is effected in each succeeding dwell of the match conveyer, such supports being maintained in raised position during the movement of the conveyer. (See Figs. 12, 13, 15 and 16.)

The feelers 215 hereinbefore referred to comprise two oppositely-disposed sets of fingers, whereof each set corresponds in number and order with one-half of the grooves of a match holder. The front ends of each series of rock shafts 213 are arranged in step formation and the fingers extend at right angles therefrom in spaced parallel relation. The free ends of the fingers are downwardly bent or curved, as at 226, to provide contact portions which directly overlie successive grooves in the adjacent match holder when the latter is at rest in front of the match supporting block 118 below the supplemental hopper.

During the movement of the match conveyer, the two series of fingers 215 are maintained in raised position above the path of the travelling match holders 75 by virtue of the shaft connections between the fingers and the arms 212, but when such arms are permitted to descend by the lowering of the T-shaped supports 217, 218 through their connection with the cam 225, the fingers also descend toward the respective grooves of the underlying match holder. If this holder is fully supplied with matches the descent of the respective fingers is interrupted by the opposing matches, thus limiting the descent of the associated arms 212 to such an extent that the set screws 216 on the arms do not come in contact with the adjacent pawl levers 200. Consequently the slide and its pawl levers reciprocate idly and the punches remain at rest. If, however, there should be a vacant groove or grooves in the match holder, the finger or fingers above such groove or grooves will descend into the groove or grooves, as the case may be, thus permitting the companion arm or arms 212 of such fingers to descend accordingly. In that case the screw or screws 216 on such arm or arms bear upon the adjacent pawl or pawls and engage it or them with the adjacent jack or jacks, whereupon such jack or jacks are actuated by the slide in a manner to push a match or matches from the match blocks 118 into the vacant space or spaces of the match holder of the conveyer. Consequently when such holder passes beyond the supplemental filling station the holder has a complete supply of matches for a match packet.

In the intermittent travel of the match conveyer the filled match holders are transported to a location where the row of matches in each succeeding holder is ejected therefrom without disturbing the parallelism of the splints, and at the same time the splints are inserted in a cupped cover blank which is supported adjacent the conveyer as will be hereinafter explained.

The means herein illustrated for ejecting the matches from the conveyer comprises a series of parallel punches 227 which correspond in number and relation with the grooves of a match holder and are reciprocable transversely of the path of the upper run of the match conveyer. These punches are secured to and project from a slide 228 which is mounted in guides 229 on an extension bracket 230 on the front of the table 54, the free ends of the punches being guided and supported in a suitably-perforated block 231 secured to the table adjacent the conveyer. (See Figs. 5, 22 and 26.) When the conveyer is at rest a filled match holder is in a position with its matches in horizontal alignment with the respective punches, and hence when the punches are reciprocated they bear against the opposing heads of the row of matches in the holder and push the row transversely of and from the holder.

In the present instance the slide 228 is provided on its underside with a tail 232 which depends through a slot in the bracket 230 and is connected by means of a link 233 with a crank disk 234 at the upper end of a vertical shaft 235. This shaft has its bearings in a support 236 on the under side of the bracket 230 and also in a bracket 237 secured to the adjacent standard 89 of the main frame. Fast on the lower end of the shaft 235 is a bevel gear 238 in mesh with a similar gear 239 on the adjacent end of the transverse shaft 87 which carries the drive member 85 of the Geneva device. (See Figs. 22, 23 and 25.) Hence rotary motion is transmitted to the eccentric disk 150

234 and the slide 228 is horizontally reciprocated in relation to the upper run of the match conveyer, the ratio of the gearing being such that the punches are moved into and withdrawn from each succeeding match holder of the intermittently moving match conveyer.

In the present instance the cover supply means includes a hopper 240 of suitable size and shape to contain a stack of flat cover blanks C each having suitably-disposed parallel score lines $a$, rows of perforations $b$ and stripes of ignition material $c$, as seen in Fig. 41. The hopper is supported on the table by brackets 241, one end of the hopper partially overhanging the horizontal run of the match conveyer. Beneath the hopper is a horizontally reciprocative bottom plate 242 having on its upper surface a transverse lip 243 which in the reciprocation of the plate pushes the lowermost blanks successively from the hopper in the direction of travel of the adjacent run of the conveyer. An end extension 244 of the plate is secured to a slide 245 which is mounted in parallel guides 246 on the table, and is jointed to one arm 247 of a lever which is fulcrumed on the table, as at 248. The other arm 249 of the lever carries a roll 250 which is operatively fitted in the race of a cam 251 fast on the driven shaft 141. The contour of the cam race is such that the lever is oscillated in each dwell of the match conveyer, thus reciprocating the slide 245 and ejecting a cover blank from the hopper. (See Figs. 2, 5, 7 and 21.)

As each cover blank is ejected from the hopper the blank is deposited flatwise upon and transversely of the receiving ends of the upper runs of two juxtaposed conveyers 252 and 253, respectively, which upper runs travel adjacent the rear edge of the upper run of the match conveyer 73, concurrently with and at the same speed as each other but at a slightly higher speed than that of the match conveyer, as will presently appear.

The conveyer 252 comprises an endless chain of links 254 and a continuous succession of cover holders 255 supported thereon. The upper run of the chain 254 is mounted and arranged to travel a relatively short distance in a longitudinal slot 256 in the table while the associated holders 255 are slidably supported on the table, such run and its holders then gradually declining through an opening in the table to a lower level for a purpose hereinafter described. The upper run of the chain 254 is flexed about sprocket wheels 257, 258, the wheel 257 being loose on a transverse shaft 259 which is fixed in brackets 260 on suitably-disposed standards 53 of the main frame, the wheel 258 being smaller than the wheel 257 and being loose on the shaft 81 previously referred to. The lower run of the chain 254 passes about a sprocket wheel 261 loose on the shaft 87 on which the driving element of the Geneva device is mounted. (See Figs. 2, 5, 21, 22 and 23.)

The upper run of the chain 254 meshes with one (262) of the members of a double sprocket wheel 263 which is secured to a gear 264 loose on the shaft 93 adjacent the gear 92 and sprocket wheel 94. The gear 264 meshes with and is intermittently driven by a gear 265 on the transverse driven shaft 88, thereby similarly actuating the sprocket wheel 263 and the upper run of the conveyer 252. The ratio of the gearing between the shaft 88 and the respective sprocket wheels 263 and 94 is such that the wheel 263 runs at a slightly higher speed than the wheel 94, as will presently appear. (See Fig. 23.)

Each of the cover holders 255 comprises a rectangular base plate having an upstanding wall 266 at its side adjacent the match conveyer which wall has therein a series of equally spaced vertical slots 267 which are formed and arranged to register with the grooves of a match holder at the location where the matches are transferred from the match conveyer to a cover. The other side of each plate is reduced, as at 268, to provide a seat for a wall block 269 on the adjacent conveyer 253, which block forms in conjunction with the base plate and slotted wall of the cover holder a rectangular open-end female die or former in which a cover-blank can be cupped preparatory to the insertion of the matches in the blank. The trailing end of each of the side walls 266 of the cover holder is provided with an upstanding stud 270 for a purpose hereinafter appearing. (See Fig. 26.)

The conveyer 253 comprises an endless chain of links 271 and a continuous succession of sets of punch elements supported thereon. The upper run of the chain is mounted and arranged to travel in a longitudinal slot 472 in the table while the associated punch elements are slidably supported on the table. The upper run of the chain 271 is flexed about a sprocket wheel 272 loose on the shaft 259 and about a sprocket wheel 273 fast on a transverse shaft 274 which has its bearings in hangers 275 at the discharge end of the table, and the lower run of the chain passes about a sprocket wheel 276 loose on the shaft 87 on which the Geneva drive element is mounted, the wheel 276 being shown as integral with the wheel 261.

The upper run of the chain 271 meshes with the member 277 of the intermittently driven sprocket wheel 263 on the shaft 93 above the Geneva stop motion, and such run is therefore intermittedly driven at this location to effect the cooperative relation of each succeeding punch element of the conveyer 253 with a cover holder of the conveyer 252.

The intermittent travel of the extended portion of the upper run of the conveyer 253 is effected by a series of intermittently rotatable sprocket wheels 278 which are mounted at intervals below the table 54 to mesh with the chain links of the conveyer 253. These wheels 278 are fast on transverse shafts 279 which have their bearings in depending brackets 280 on the table and are provided with bevel gears 281 in mesh with similar gears 282 on the intermittently-driven longitudinally-extending shaft 103 at the front of the machine. The ratio of the bevel gears is such that uniform intermittent motion at the requisite speed is transmitted from the shaft 103 to the extended portion of the conveyer 253.

The transverse end shaft 274 has fast thereon a sprocket wheel 283 which is operatively connected by means of a chain 284 with a sprocket wheel 285 on the adjacent driven transverse shaft 279. Thus intermittent motion is transmitted from the wheel 285 to the wheel 283 and its shaft 279, and the sprocket wheel 273 and the upper run of the conveyer 253 are correspondingly impelled. (See Figs. 2, 3, 7, 8, 21 and 23.)

Each of the punch elements of the conveyer 253 comprises a rectangular base plate 286 having at its forward end the horizontally perforated wall block 269 previously mentioned, which block is recessed on its under side, as at 287, to overlap the reduced portion 268 of the adjacent plate of the cover holder 255. The rear end of the base plate 286 has a longitudinally slotted wall 288 parallel to the block 269. Slidably mounted on the plate 286 for movement in the space between the block and wall is a punch head 289 having a series of parallel punches 290 corresponding in number and relation with the grooves of a match holder 75 of the match conveyer, the free ends of which punches are slidably supported in a corresponding row of perforations 291 in the block 269. (See Figs. 5, 22 and 23, 26, 27, 29 and 30.) Normally the punches 290 are in retracted position with their free ends seated within the rear portions of the perforations of the block 269, but when the punch element reaches the discharge end of the machine the punches are projected through the perforations in order to eject the finished match packets, as will be hereinafter explained.

The trailing end of the wall 288 of each punch element is provided similarly to the wall 266 of each cover holder, with an upstanding stud 292; the studs of the companion cover holder and punch element of the respective conveyers 252 and 253 as they pass upward and through the table adjacent the cover hopper being in horizontal alignment so as to abut squarely against the trailing edge of a cover blank deposited on the conveyers.

The cover blanks C carried by the conveyers 252 and 253 are somewhat wider than the respective groups of matches carried by the match conveyer 73, and the succeeding cover and punch elements are arranged to support the respective covers in spaced relation. Hence the distance between the centers of two adjacent covers on the conveyers 252, 253 is greater than that between the centers of two adjacent match holders on the conveyer 73. The conveyers 252 and 253 are run at a higher speed than the conveyer 73 in order to compensate for the increased distance between the centers of the covers, and provision is had for the accurate central registry of each succeeding cover with a match holder at the location where a group of matches is being transferred from the holder to the adjacent cover. Consequently the actuating sprocket wheel 94 for the conveyer 73 and the actuating sprocket wheel 263 for the associated conveyers 252 and 253 are mounted in axial alignment and are driven at relatively different speeds as previously mentioned.

From the foregoing described construction it will be seen that as each succeeding cover blank is ejected flatwise from the hopper 240 the blank is positioned flatwise directly above the path of the two conveyers 252 and 253, and that as these conveyers progress the paired up-projecting studs 292 and 270 on the associated cover holder and punch element abut against the trailing edge of the blank in a manner properly to position the blank upon the cover holder and punch element and to ensure its travel with the conveyers.

The delivery side of the cover blank hopper 240 is provided with a pair of spaced projecting fingers 293 which overlie the body of the cover blank as it is being ejected, thus insuring its deposit on the top of the conveyers. The ends of the cover blank as it progresses with the conveyers, are maintained in proper position by parallel guide plates 294 which overhang the path of the blank, and which plates are conveniently secured to the top of the table 54. (See Figs. 5, 21 and 29.) Each succeeding cover blank is transported by the conveyers 252 and 253 to a location in line with the reciprocating match ejecting punches 227, and in the dwell of such conveyers at this location a die member 295 at the foot of a vertically reciprocating plunger 296 which overhangs the conveyer 252, descends upon the body of the opposing cover blank. The under surface of the die member 295 is provided with a series of parallel grooves 297 which correspond with the grooves of the adjacent match holder 75 and align therewith when the plunger is down. In its descent the die member 295 forces the blank into the opposing former constituted by the associated cover holder 255 and perforated plunger well 266, thus cupping the blank. As seen in Fig. 42 the cupped blank thus produced has one of its upstanding sides shorter than the other, and the rows of perforations b are at the lower edges of the respective sides and in horizontal alignment with each other.

The plunger 296 is slidably fitted in guides in a standard 298 on the table, and is pivotally connected at its upper end to one arm 299 of a lever which is fulcrumed, as at 300, on the standard. The other arm 301 of the lever is connected by means of a link 302 with a vertically-reciprocative bar 303 which is supported at its upper portion in guides 304 on the standard. The lower end of the bar 303 has fixed thereon a slotted foot 305 which embraces the transverse driven shaft 87, and which foot has a lateral roll 306 which is operatively fitted in the race of a face cam 307 fast on the drive member 85 of the Geneva device. The contour of the cam is such that in each dwell of the associated conveyers 252 and 253 the bar 303 is reciprocated, thus oscillating the lever 301, 299 and effecting the requisite vertical reciprocation of the plunger 296, it being noted that this plunger remains in its down position and serves as a guide for the matches while they are being inserted in the cupped cover blank. (See Figs. 2, 7, 21, 22 and 23.)

While the plunger 296 is in down position the three conveyers are at rest and the punches 227 are projected into the grooves of the opposing match block, thus pushing the row of matches from the grooves and into the two aligning rows of perforations of the partially formed cover until the heads of the matches contact with the shorter upstanding member of the cover, as seen in Fig. 43. The matches are of greater length than the width of the space between the upstanding members of the cover and therefore the tails of the group of match splints are entered some distance in the perforations of the adjacent wall block 269 of the conveyer 253 and thereby supported.

In the continued advancement of the three conveyers the cover-blank conveyer 252 gradually declines from its horizontal path, as previously mentioned, thus leaving the filled cover supported by the ends of the match splints in the block 269 of the conveyer 253, as clearly seen in Fig. 21.

As each match filled cover blank progresses the rear long upstanding flap thereof is supported by a backer rail 308 which extends longitudinally of the conveyer 253 and is held at its respective ends by brackets 309 and 310, which are affixed to the table and overhang the conveyer 253. (See Figs. 5, 28 and 30.)

A reciprocative blade 311 which extends transversely of the match conveyer 73 adjacent the ejecting punches 227 is operative in its rearward stroke to pass above the slotted wall of the adjacent cover holder 255 of the conveyer 252 and bear against and partially bend the short upstanding flap of the match filled cover blank when a succeeding cupped blank is being supplied with matches. The blade 311 has at its front end an angular portion 312 which is secured to the punch slide 228, and hence the blade is reciprocated concurrently with the slide. (See Figs. 5 and 26.)

Supported laterally adjacent and longitudinally of the conveyer 253 is a flat blade 313 having an elongated bevelled edge portion 314 which lies in the path of the partially bent short flaps of the filled cover blanks, and hence as the blanks progress with the conveyer 253 such short flaps bear against the bevelled portion and are thereby gradually folded over upon the underlying match splints in the respective blanks. The body of the blade 313 is supported by a suitably-disposed bracket 315 which bridges the match conveyer and is secured to the table 54. The blade has secured at its butt end a yielding presser plate 316 which presses the short flap upon the match splints of each succeeding partially formed match packet and maintains the flap in the closely-folded condition illustrated in Fig. 44. This plate has an opening 317 therein which overlies the central portion of the folded flap in a dwell of the conveyer, as seen in Fig. 28. The plate terminates in a finger 318, the function of which as also that of the opening 317 will presently appear.

Suported on the table adjacent the path of the conveyer 253 in the vicinity of the presser plate 316 is a wire stitching machine 319 of any usual or approved construction, which machine includes a reciprocating staple driver 320 and a fixed anvil 321 between which progress and come to rest the partially formed match packets projecting from the conveyer 253. The staple driver 320 overhangs the opening 317 of the presser plate 316, and is reciprocated in timed relation to the travel of the conveyer 253 so that when the partially formed packet is at rest beneath the opening a staple $x$ is inserted by the driver through the folded short flap and the bottom member of the cover, the legs of the staple being clinched by the anvil. The staple $x$ is disposed longitudinally of the match splints with the legs of the staple in the space between adjacent matches. (See Figs. 28, 31 and 45.)

The usual operating shaft 323 of the stitcher is driven from a longitudinally extending shaft 324 having its bearings in brackets 325 on the rear of the table 54. The shaft 323 has fast thereon a sprocket wheel 326 which is connected with and driven from a similar wheel 327 on the shaft 324 by means of a chain 328, and the latter shaft, in turn, has fast thereon a sprocket wheel 329 which is connected with and driven from a similar wheel 330 on the main shaft 55 of the packeting machine by means of a chain 331. (See Figs. 2, 5, 8, 22 and 24.)

Arranged in the path of the upstanding long flap of the cover as it approaches the stitcher 319 is a yielding backer member comprising a longitudinally-extending bowed spring 332 (Figs. 5, 28 and 30) whereof one end is affixed to the bracket 310 which supports one end of the longitudinal backer bar 308. In the step movement of the partially-formed packet to the stitcher the long flap comes in contact with the opposing member of the spring 332 and is thereby gradually pressed forward, as indicated by the dotted lines in Fig. 30, to facilitate the subsequent folding of the long flap down upon the short flap of the cover in the next succeeding dwell of the conveyer 253, as will presently appear.

On the under side of the forward end of the bracket 310 is secured an end bevelled shoe 333 which lies directly above and longitudinally of the path of the perforated wall blocks 269 of the conveyer 253, so that as each succeeding block with a partially-folded packet of matches approaches the stitcher 319 such block slides under the shoe and is thereby maintained in proper horizontal position in respect to the driving and clinching elements of the stitcher.

In the next succeeding step of the conveyer 253 the terminal finger 318 of the presser plate 316 bears upon the stapled short flap of the cover, and maintains the flap throughout its width in close contact with the underlying match splints, and at the end of this step while the conveyer is at rest, the upstanding long flap of the cover is folded over upon the stapled short flap and then backwards under and against the bottom of the cover to complete the folding operation.

Figure 47:
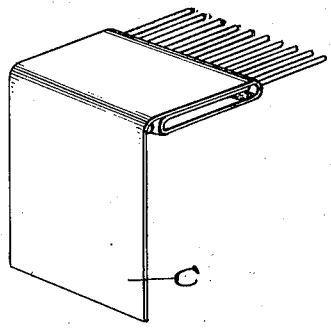

The preferred form of folding mechanism herein shown for the long flaps of the covers is as follows:

334 designates an ironing head which is reciprocable transversely of the patch of the extension of the conveyer 253 and the partially folded packet of matches in such manner as to bear against the outer face of the opposing long flap and fold it upon the stapled short flap to the condition shown in Fig. 46, and which head then moves vertically by gravity and presses the free projecting end of the long flap downward at right angles to the body of the partially formed packet and firmly against the heads of the matches assembled therein, as seen in Fig. 47.

In the present instance the ironing head 334 comprises a vertically disposed elongated block having a curved basal portion 335 of substantial width, and having also a vertical slot 336 in its rearward side in communication with a longitudinally-extending recess 337 in the body of the head. (See Figs. 32 and 35.)

The free end of an actuating arm 338 extends freely into the slot 336 and terminates in a T-shaped enlargement 339$^x$ which is loosely confined in the recess 337, and therefore the ironing head not only partakes of the travel of the arm 338 but it also has limited vertical movement relative to the arm. The arm extends rearward beyond the table 54 and has a bifurcated guide extension 339 which embraces the driven shaft 324 previously mentioned. The extension is provided with a lateral roll 340 which is operatively fitted in the race of a face cam 341 fast on the shaft 324, and the arm is loosely supported between its ends by means of a link 342 which is pivoted thereto and to a suitably-disposed bracket 343 on the table. The contour of the cam race is such that during its rotation the arm 338 is moved in an orbital path, that is, the arm is reciprocated transversely of the path of the conveyer 253, and, by virtue of the link connection 342, a falling motion is imparted to the arm during its forward stroke and a rising motion during its backward stroke.

The co-operative relation of the parts just described is such that when the arm 338 is retracted its forward end is raised and the ironing head 334 thereon is above the path of the conveyer 253 and immediately back of the upstanding long cover flap. In the initial forward stroke of the arm the front face of the head bears against the flap and swings it over the body of the packet, and as the stroke continues the foot of the ironing head bears by gravity upon the flap and presses it into a horizontal plane and in close contact with the underlying stapled short fold, as seen in Fig. 32. (See also Fig. 36.) When the ironing head reaches the end of its forward stroke, adjacent the match heads, where the projecting portion of the long flap is unsupported, the ironing head by its weight presses such projecting portion downward and against the match heads, as indicated in dotted lines in Fig. 33. (See also Fig. 47.)

In the initial back stroke of the arm 338 its free end and therewith the ironing head are raised, such head in its upward movement pressing against and clearing the packet and then returning to its previous position in readiness for a succeeding operation.

As the ironing head is being raised to escape the downwardly bent portion of the long flap, this portion is folded back under and against the bottom of the packet. The means herein illustrated for this purpose comprises a horizontally reciprocable plate 344 movable toward and from the pendant flap portion at the front of the packet, and having at its acting end an angular folding member 345. The plate is secured to a slide 346 which is fitted in horizontal guides 347 at the front of the table, and is connected by means of a link 348 with the arm 338 at its pivotal support, so as to be reciprocated by actuation of the arm; the co-operative relation of the parts being such that at or about the instant the ironing head is raised from the flap the angular member 345 of the plate 344 impinges against the pendant portion of the flap and pushes it under the packet and squarely against the match heads, as seen in Fig. 33. (See also Fig. 48.)

A head 448 (Figs. 24 and 31) is mounted and arranged for horizontal movement toward and from the front of the partially formed packet when the latter is presented to the stitcher 319, the rearward or acting end of the head being longitudinally channeled, as at 349, to embrace the opposing end of the packet. This head is supported by the lower end of a pendant arm 350 on a rock-shaft 351 which has its bearings on the standard of the stitcher. A spring 352 secured to the arm 350 and to a pin 451 on the standard tends to maintain the arm and its head 448 retracted. Fast on the rock-shaft 351 is a vertically-disposed actuating lever, whereof the upper arm 353 has a roll 354 which bears against a suitable cam 355 on the operating shaft 323 of the stitcher, the contour of the cam being such that immediately when the packet is presented to the stitcher and before the ascent of the driver, the lever arm is forced outward, thus moving the arm 350 and the head 448 inward against the action of the spring 352, and, perforce, pushing the channeled portion of the head squarely against the opposing end of the packet and ensuring its accurate relation to the stitcher.

As the conveyer 253 progresses from the stitcher the packet is withdrawn from the finger 318 and is thereafter positioned with its trailing edge portion between the staple driver and the clinching anvil of a second stitching machine 356 supported on the table a suitable distance from the first stitcher. While the conveyer is at rest at the second stitcher a staple y is inserted by the driver through the respective folds of the cover, and the legs of the staple are clinched by the anvil against the bottom fold. This staple is disposed longitudinally of the match splints with the legs of the staple between the trailing edge of the cover and the adjacent outer match of the group. (See Fig. 49.)

The operating shaft 323 of the second stitcher is connected by suitable sprocket gearing with the driven shaft 324 similarly to the operating shaft of the first stitcher.

Means are provided to maintain the final fold of the cover in close relation to the adjacent portion of the cover as the packet is advanced to and positioned at the second stitcher, and also to insure the accurate disposition of the packet in relation to the driver and anvil of the stitcher, which means are preferably as follows:

Secured to the support 357 for the anvil 321 of the stitcher 356 is a plate 358 which extends longitudinally of and directly under the path of the packets between the final folding station and the anvil. The upper surface of this plate adjacent the folding station has an elongated bevelled portion 359 which merges with a flat horizontal portion leading to the anvil, so that as the packet advances the bottom fold, if drooping, is supported by the bevelled portion and thereby gradually cammed up to horizontal position and in contact with the adjacent fold. (See Figs. 31, 36 and 38.)

As at the first stitcher a channelled packet positioning head 448 and means for periodically moving it toward and from the front end of the packet at the second stitcher are employed, which head and the operating mechanism therefor are the same in construction and operation as previously described, except that the arm 353 is provided with a lower extension 360 which depends adjacent the front of the packet conveyer 253 and is jointed, as by a pin and slot connection 361, 362 with one arm 363 of a bell-crank plate which is pivoted on a projecting lug 364 on the stationary cam plate 358. The other arm 365 of the bell-crank underlies the path of the packet adjacent the stitcher 356 and is provided with a suitably-disposed bevelled tooth or stud 366 which extends slightly above the path of the bottom of the packet and in advance of the stitcher.

In the final step of the packet to this stitcher the under surface of the packet slides upon and escapes the stud 366; and coincidentally with the movement of the lever to push the adjacent head 448 forward against the front end of the opposing packet, the bell-crank is swung by the arm 360 in a manner to press the stud against the opposing edge of the cover, which stud thus co-acts with the head 448 to effect and ensure the accurate positioning of the packet in respect to the second stitcher. (See Figs. 31, 36, 37 and 38.)

In the continued progress of the conveyer 253 the packet is advanced from the second stitcher to a position with its leading edge portion between the staple driver and the clinching anvil of a third stitcher 367. A longitudinally disposed strip 368 is mounted on the table to underlie and support the packets as they pass from the second to the third stitcher. While the conveyer is at rest at the third stitcher a staple z is inserted by the driver through the respective folds of the cover and the legs of the staple are clinched by the anvil against the bottom fold. The staple z is disposed longitudinally of the match splints with the legs of the staple between the leading edge of the cover and the adjacent outer match of the group. (See Fig. 50.) This completes the packet forming operation.

The finished packets are advanced by the conveyer 253 to a station where they are successively discharged by actuation of each succeeding series of punches 290 of the conveyer, as follows, reference being had to Figs. 2, 6, 8, 39 and 40:

Mounted in a guide structure 369 at the rear of the discharging end of the table is a slide 370 which is reciprocable transversely of the table. This slide is pivotally connected by means of a link 371 to the upper arm 372 of a lever which is fulcrumed on a standard 373 on the bed 52. The lower arm 374 of the lever has a lateral roll 375 which is operatively fitted in the race of a face cam 376 on the main shaft 55, the contour of the race being such that in each dwell of the conveyer 253 the lever is oscillated and the slide 370 accordingly moved toward and from the upper run of the conveyer. On the forward end of the slide 370 is an extension blade 377 which, in the forward movement of the slide, passes through the slot 378 in the rearward wall 288 of each succeeding series of punch elements of the conveyer 253 so as to bear against the punch head 289 and thereby push the punches of the latter through the perforations in the associated match supporting block 269 in such a manner that the punches impinge against the opposing tails of the match splints in the block 269 and project the finished packet beyond the front of the conveyer.

When each match packet is ejected from the conveyer 253 and the latter is at rest, the punches 290 are returned to their previous position. For this purpose a pawl arm 379 having at its forward or free end a depending tooth 380, is pivoted on the slide, as at 381, so as to overhang the conveyer, said arm having a vertical adjusting screw 382 which bears upon the slide. The tooth 380 is so positioned that it lies directly in front of each succeeding punch head 289 when the latter is advanced to the discharge station; and therefore when the punch head is pushed forward by the blade 377 the pawl arm moves correspondingly with, and positions the tooth 380 in advance of the punch head, which pawl arm at the limit of the stroke overlies the adjacent perforated wall block 269, as seen in Fig. 6. Hence when the slide is retracted the pawl tooth 380 bears against the punch head 289 and returns it to its previous position.

The tooth 380 is preferably bevelled, as at 383, to insure the passage of each succeeding punch head in rear of the tooth.

As each finished packet is ejected from the conveyor 253 the packet falls flatwise upon the table 54 and at the mouth of a guideway 384 leading to a suitable discharge chute 385. In the present instance a vertical plate 386 on the free end of a horizontal plunger 387 pushes each succeeding packet along the guideway. This plunger is pivotally connected to an upstanding arm 388 on the forward end of a transverse rock shaft 389 which has its bearings in brackets 390 on the table. A similar arm 391 on the rear end of the shaft 389 bears a roll 392 which is operatively fitted in the race of a cam 393 fast on the driven shaft 324, the contour of which race is such to effect the timely oscillation of the rock-shaft and the reciprocation of the plunger 387.

It is to be understood that my invention is not limited to the particular structures and mechanisms herein disclosed as the same may be variously modified within the principle of the invention and the scope of the appended claims.

I claim:—

1. A match packeting machine having a continuous succession of travelling holders to receive and support groups of matches extending transversely of the holders, means for supplying matches to said holders, a continuous succession of travelling former members constructed and arranged to progress adjacent to and parallel with the charged holders, means for supplying cover blanks to said former members, means for co-acting with said former members to cup therein the respective blanks, means for pushing groups of matches from the said holders into and through the walls of the respective cupped blanks in the said former members, and means for moving the said holders and former members in timed relation.

2. A match packeting machine having a continuous succession of travelling holders to receive and support groups of matches extending transversely of the holders, means for supplying matches to said holders, a continuous succession of travelling former members constructed and arranged to progress adjacent to and parallel with the charged holders, means for supplying cover blanks to said former members, means for co-acting with said former members to cup therein the respective blanks, means for pushing groups of matches from the said holders into and through the respective cupped blanks in the said former members, a continuous succession of travelling packet carrying members constructed and arranged to receive and support the tails of the matches inserted in the cupped blanks in the former members and thereafter to progress beyond the former members, and means for moving the said holders and the said former and packet carrying members in timed relation.

3. A match packeting machine having a continuous succession of travelling holders to receive and support groups of matches extending transversely of the holders, means for supplying matches to said holders, a continuous succession of travelling former members constructed and arranged to progress adjacent to and parallel with the charged holders, means for supplying cover blanks to said former members, means for co-acting with said former members to cup therein the respective blanks, means for pushing groups of matches from the said holders into and through the respective cupped blanks in the said former members, a continuous succession of travelling packet carrying members constructed and arranged to receive and support the tails of the matches inserted in the cupped blanks in the former members and thereafter to progress beyond the former members, means for moving the said holders and the said former and packet carrying members in timed relation, and means adjacent the path of the said packet carrying members for folding the flaps of each succeeding cover blank.

4. A match packeting machine having a continuous succession of travelling holders to receive and support groups of matches extending transversely of the holders, means for supplying matches to said holders, a continuous succession of travelling former members constructed and arranged to progress adjacent to and parallel with the charged holders, means for supplying cover blanks to said former members, means for co-acting with said former members to cup therein the respective blanks, means for pushing groups of matches from the said holders into and through the respective cupped blanks in the former members, a continuous succession of travelling packet carrying members constructed and arranged to receive and support the tails of the matches inserted in the cupped blanks in the former members, and thereafter to progress beyond the former members, means for moving the said holders and the said former and packet carrying members in timed relation, means adjacent the path of the packet carrying members for folding the flaps of each succeeding cover blank, and means adjacent the said path for securing the said folded flaps.

5. A match packeting machine having a continuous succession of travelling holders to receive and support groups of matches extending transversely of the holders, means for supplying matches to said holders, a continuous succession of travelling former members constructed and arranged to progress adjacent to and parallel with the charged holders, means for supplying cover blanks to said former members, means for co-acting with said former members to cup therein the respective blanks, means for pushing groups of matches from the said holders into and through the respective cupped blanks in the former members, a continuous succession of travelling packet carrying members constructed and arranged to receive and support the tails of the matches inserted in the cupped blanks in the former members and thereafter to progress beyond the former members, means for moving the said holders and the said former and packet carrying members in timed relation, means adjacent the path of the packet carrying members for folding the flaps of each succeeding cover blank, means adjacent the said path for securing the said folded cover flaps, and means for ejecting the finished packets from the said packet carrying members.

6. A match packeting machine having a continuous succession of travelling holders to receive and support groups of parallel matches extending transversely of the holders, means for supplying matches to said holders, a continuous succession of travelling former members constructed and arranged to progress a limited distance adjacent to and parallel with the charged holders, means for supplying cover blanks to said former members, means for co-acting with said former members to effect the cupping therein of the respective blanks, means for pushing groups of matches from the said holders into and through the respective cupped blanks in the former members, a continuous succession of packet carrying members constructed and arranged to receive and support the tails of the matches inserted in the cupped blanks in the former members and thereafter to progress beyond the former members, means for moving the said holders and the said former and packet carrying members in timed relation, means adjacent the path of the packet carrying members for folding the flaps of each succeeding cover blank, means adjacent the said path for securing the said folded flaps, and means for ejecting the finished packets from the said packet carrying members.

7. A match packeting machine having two concurrently travelling endless conveyers, one of which travels a limited distance in close parallel relation to, and then recedes from the other conveyer, the first named conveyer including a succession of members each having a former wall spaced from the second-named conveyer, said latter conveyer including a succession of punch elements each having a perforated former wall adjacent the first-named conveyer and arranged to travel in spaced relation to a former wall on the first-named conveyer, and having also a series of punches reciprocable in the perforated former wall, means for cupping cover blanks between the complementary former walls of adjacent portions of the two conveyers, means for thereafter inserting a row of parallel match splints through each succeeding cupped blank transversely thereof so that the tails of the splints will be entered into and supported by the perforated wall of a punch element and thereby transported with the associated cover blank in a path beyond the receding portion of the first-named conveyer, means adjacent the said path for folding the flaps of each succeeding cover blank, means adjacent said path for securing the folded cover flaps, and means for thereafter actuating the punches of the punch elements to push the opposing match packets from the second-named conveyer.

8. In combination with mechanism for inserting succeeding rows of parallel matches in a cupped cover blank, an endless conveyer having a succession of elements each including a wall member extending longitudinally of the conveyer and having a row of perforations which receive and support the tails of matches inserted in a cover blank and each of said elements also including a punch head having a series of parallel punches reciprocable in the perforations of said wall member, means for folding the flaps of each succeeding cover blank having a charge of matches supported by the said wall member, means for securing the folded flaps, and means for actuating each punch head to eject the opposing matches and their covers from the associated wall member, said last named means comprising a reciprocative element having a member operative to move the punch head toward the opposing matches, a member on said element having a portion to engage and retract the punch head, and means for actuating said reciprocative element in timed relation to the travel of the conveyer.

9. A match packeting machine having two concurrently travelling conveyers, the first of which travels a limited distance in close parallel relation to and then recedes from the second conveyer, said conveyers including complementary former walls whereof each former wall of the second conveyer is constructed to receive and support the tails of a row of match splints, means for cupping cover blanks between the complementary former walls of adjacent portions of the two conveyers, and means for thereafter inserting a row of parallel splints through each succeeding cupped blank transversely thereof, so that the splints are supported at their tails by the former wall of the second conveyer and thereby transported with the associated cover blank beyond the receding portion of the first conveyer.

10. A match packeting machine having an endless match conveyer including a succession of holders each constructed to receive and support a group of matches extending transversely of the conveyer, means for supplying matches to said holders, a second endless conveyer including a succession of former members constructed and arranged to travel adjacent to and parallel with the first conveyer, the distance between the centers of adjoining former members being greater than that between the centers of adjoining group match holders, mechanism for intermittently actuating said conveyers at relatively different speeds to position each succeeding former member in registry with a group match holder, means for supplying flat cover blanks to said former members, means for co-acting with said former members to cup therein the respective blanks, and means for pushing the group of matches from each holder into the cupped blank in the former member in registry with said holder.

11. A match packeting machine having an endless match conveyer including a succession of holders each constructed to receive and support a group of matches extending transversely of the conveyer, means for supplying matches to said holders, a second endless conveyer including a succession of former members constructed and arranged to travel adjacent to and parallel with the first conveyer, the distance between the centers of adjoining former members being greater than that between the centers of adjoining group match holders, mechanism for intermittently actuating said conveyers at relatively different speeds to position each succeeding former member in registry with a group match holder, said mechanism including suitably driven members which engage the respective conveyers adjacent the registering holder and former member, means for supplying flat cover blanks to said former members, means for co-acting with said former members to cup therein the respective blanks, and means for pushing the matches from each holder into the cupped blank in the former member in registry with said holder.

12. A match packeting machine having an endless match conveyer including a succession of holders to receive and support groups of matches extending transversely of the conveyer, means for supplying matches to said holders, a second endless conveyer including a succession of former members constructed and arranged to travel a limited distance adjacent to and parallel with the first conveyer and then recede therefrom, the distance between the centers of adjoining former members being greater than that between the centers of adjoining match holders, a third endless conveyer including a succession of splint-end supporting members constructed and arranged to travel parallel with and beyond the former members of the second conveyer, mechanism for intermittently actuating said match conveyer at a given speed and for concurrently actuating the other conveyers at a relatively higher speed, whereby each succeeding former member with its associated splint-end supporting member is positioned in registry with a match holder, means for supplying flat cover blanks to said former members, means for co-acting with said former members to cup therein the respective blanks, and means for pushing the matches from each holder into the cupped blank in the former member in registry with said holder and engaging the tails of the splints with the splint-end supporting member associated with said former member.

13. A match packeting machine having an endless match conveyer including a succession of holders to receive and support groups of matches extending transversely of the conveyer, means for supplying matches to said holders, a second endless conveyer including a succession of former members constructed and arranged to travel a limited distance adjacent to and parallel with the first conveyer, the distance between the centers of adjoining former members being greater than that between the centers of adjoining match holders, a third endless conveyer including a succession of splint-end supporting members constructed and arranged to travel parallel with and beyond the former members of the second conveyer, mechanism for intermittently actuating said match conveyer at a given speed and for concurrently actuating the other conveyers at a higher speed, whereby each succeeding former member with its associated splint-end supporting member is positioned in registry with a match holder, said mechanism including suitably driven members which engage the respective conveyers adjacent the registering holder and former member, means for supplying flat cover blanks to said former members, means for co-acting with said former members to cup therein the respective blanks, and means for pushing the matches from each holder into the cupped blank in the former member in registry with said holder and engaging the tails of the splints with the splint-end supporting member associated with said former member.

14. A match packeting machine having an intermittently moving endless conveyer including a succession of holders each constructed to receive and support a group of matches extending transversely of the conveyer, means for simultaneously supplying matches to a plurality of spaced-apart holders during each dwell of the conveyer, said holders being in such spaced relation to each other and to the match supplying means that in each dwell of the conveyer each succeeding holder as it passes beyond the supply means carries a group of matches, means for supporting cupped cover blanks adjacent the path of the holders after they leave the match supply means, and means for pushing the group of matches from each succeeding holder into and through a cupped cover blank supported by said supporting means.

15. In a match packeting machine, a match supply hopper having a discharge outlet, a match supporting member having parallel match seats therein spaced below said outlet, agitating side walls for the passage between the outlet and the said supporting member, each of said walls having upper and lower inwardly converging surfaces whereby the said passage is laterally constricted between the top and bottom thereof, and means for concurrently moving said walls toward and from each other, whereby in the inward movement of the walls their upper inner surfaces raise and their lower inner surfaces depress the interposed matches.

16. The combination with a succession of intermittently movable holders provided with parallel match seats to receive and support rolls of matches extending transversely of the holders, and means for supplying matches to said holders, of a member arranged laterally of the path of the holders and provided with parallel seats to receive and support a row of matches in longitudinal alignment with the seats of a holder during each dwell of said holder, means for supplying matches to said member, a series of parallel punches independently reciprocable in and longitudinally of the match seats in said member, a corresponding series of parallel slide jacks for said punches, each jack having on its upper edge opposing pawl engaging portions in spaced relation, a series of pawl levers corresponding in number with and arranged to overhang said jacks, the arms of each lever being movable into and from engagement with the respective pawl-engaging portions of the adjacent jack, a slide on which said levers are mounted, means for reciprocating said slide during each dwell of the holders, and means for determining the active and inactive positions of the respective arms of each pawl lever in relation to the pawl-engaging portions of the adjacent jack, said means being controlled by the presence and absence of matches in a match holder adjacent the path of the punches.

17. The combination with a succession of intermittently movable holders provided with parallel match seats to receive and support rows of matches extending transversely of the holders, and means for supplying matches to said holders, of a member arranged laterally of the path of the holders and provided with parallel seats to receive and support a row of matches in longitudinal alignment with the grooves of a holder during each dwell of said holder, means for supplying matches to said member, a series of parallel punches independently reciprocable in and longitudinally of the match seats in said member, a corresponding series of parallel slide jacks for said punches, each jack having on its upper edge opposing pawl engaging portions in spaced relation, a series of pawl levers corresponding in number with and arranged to overhang said jacks, the arms of each lever being movable into and from engagement with the respective pawl engaging portions of the adjacent jack, a slide on which said levers are mounted, means for reciprocating said slide during each dwell of the holders, means for determining the active and inactive positions of the respective arms of each pawl lever in respect to the pawl-engaging portions of the adjacent jack, a series of independently movable pawl-actuating arms having contact portions which overlie the respective pawl levers when the latter are in retracted position, a series of feelers which overlie the respective seats of a match holder positioned adjacent the path of the punches, a series of parallel rock-shafts each of which carries a feeler and a pawl actuating arm, a vertically reciprocative support for the series of actuating arms, and means for operating said support in timed relation to the travel of the holder.

18. In a match packeting machine having an endless conveyer including means to support at one side of the conveyer the projecting tails of a succession of rows of matches associated with cupped cover blanks whereof each blank has long and short upstanding flaps, a stationary folding blade extending laterally adjacent and longitudinally of the conveyer in the path of the short flap and arranged to press the short flap of each progressing cover blank gradually toward and upon the row of matches associated with the blank.

19. In a match packeting machine having an endless conveyer including means to support at one side of the conveyer the projecting tails of a succession of rows of matches associated with cupped cover blanks whereof each blank has long and short upstanding flaps, a stationary folding blade extending laterally adjacent and longitudinally of the conveyer in the path of the short flap and arranged to press the short flap of each progressing cover blank gradually toward and upon the row of matches associated with the blank, and means for fastening the folded short flap to the body of each cover.

20. In a match packeting machine having an endless conveyer including means to support at one side of the cover the projecting tails of a succession of rows of matches associated with cupped cover blanks whereof each blank has long and short upstanding flaps, a stationary folding blade extending laterally adjacent and longitudinally of the cover in the path of the short flap and arranged to press the short flap of each progressing cover blank gradually toward and upon the row of matches contained in the blank, means for fastening the folded short flap to the body of each cover, and means for folding the long flap upon the folded short flap and then reverting the free portion of the long flap against the opposite side of the body of the cover.

21. In a match packeting machine having an endless conveyer including means to support at one side of the conveyer the projecting tails of a succession of rows of matches associated with cupped cover blanks whereof each blank has long and short upstanding flaps, a stationary folding blade extending laterally adjacent and longitudinally of the conveyer in the path of the short flap and arranged to press the short flap of each progressing cover blank gradually toward and upon the row of matches associated with the blank, means for fastening to the body of the cover the folded short flap of each succeeding cover blank, means for folding the long flap upon the folded short flap and then reverting the free portion of the long flap against the opposite side of the body of the cover, and means for fastening the respective folds to the body of the cover.

22. In a match packeting machine having an endless conveyer including means to support at one side thereof the projecting tails of rows of matches associated with cupped cover blanks whereof each blank has a long upstanding flap, means including a horizontally reciprocative ironing head having independent vertical movement for folding the long flap of each succeeding cover upon the contained matches and then depressing the projecting free end of said flap.

23. In a match packeting machine having an endless conveyer including means to support at one side thereof the projecting tails of rows of matches associated with cupped cover blanks whereof each blank has a long upstanding flap, means including a horizontally reciprocative ironing head having independent vertical movement for folding the long flap of each succeeding cover upon the contained matches and then depressing the projecting free end of the said flap, and means for reverting the depending portion of said flap against the bottom of the cover.

24. In a match packeting machine having an endless conveyer including means to support at one side of the conveyer the tails of a succession of rows of matches threaded through cupped cover blanks whereof each blank has long and short upstanding flaps, means to fold the short flap of each progressing cover blank toward and upon the row of matches contained in the blank, means including a horizontally reciprocative ironing head having independent vertical movement for feeding the long flap upon the folded short flap and then depressing the projecting free end of said long flap, and means for reverting the depending portion of said long flap against the bottom of the cover.

25. In a match packeting machine having an endless conveyer including means to support at one side of the conveyer the tails of a succession of rows of matches threaded through cupped cover blanks whereof each blank has a long upstanding flap, resilient backer means extending into the path of the flap of each progressing cover so as to press the flap slightly forward during the movement of the conveyer, horizontally and vertically reciprocative means for thereafter folding the long flap of each succeeding cover upon the contained matches and then depressing the projecting free end of the flap, and means for reverting the depending end of said flap against the bottom of the cover.

26. In mechanism for folding the cover flaps of match packets, an ironing member, an actuating arm upon which said member is loosely mounted for independent vertical movement, and means for reciprocating said arm in an orbital path whereby the head in its travel bears against the flap and folds it upon and along the adjacent matches, then moves vertically by gravity to press the free projecting end of the flap downwardly, and is then raised.

27. In mechanism for folding the cover flaps of match packets, an ironing member, an actuating arm upon which said member is loosely mounted for independent vertical movement, and means for reciprocating said arm in an orbital path whereby the head in its travel bears against the flap and folds it upon and along the adjacent matches, then moves vertically by gravity to press the free projecting end of the flap downwardly and is then bodily raised, and means for reverting the depending portion of said flap against the underside of the cover.

28. In a match packeting machine having an endless conveyer including means to support at one side of the conveyer the projecting tails of a succession of rows of matches associated with cupped cover blanks whereof each blank has long and short upstanding flaps, a stationary folding blade extending laterally adjacent and longitudinally of the conveyer in the path of the short flap and arranged to press the short flap of each progressing flap gradually toward and upon the row of matches contained in the blank, means for fastening the folded short flap to the body of each cover, a resilient finger arranged to bear on the fastened folded flap, and means for folding the long flap upon the folded short flap while the finger is in contact with the latter flap, and then reverting the free portion of the long flap against the opposite side of the body of the cover.

29. In a match packeting machine having an endless conveyer including means to support at one side of the conveyer the projecting tails of a succession of rows of matches associated with cover blanks whereof each blank has long and short upstanding flaps, means for folding the short flap of each succeeding cover, means for fastening the short flap to the body of each cover, means for folding the long flap upon the folded short flap and then reverting the free portion of the long flap against the opposite side of the body of the cover, means for fastening the respective folds at different points to the body of the cover, and a cam member for supporting the final fold of the cover as it approaches a fastening position.

30. In a match packeting machine having an endless conveyer including means to support at one side of the conveyer the projecting tails of a succession of rows of matches associated with cover blanks whereof each blank has long and short upstanding flaps, means for folding the short flap of each succeeding cover, means for fastening the short flap to the body of each cover, means for folding the long flap upon the folded short flap and then reverting the free portion of the long flap against the opposite side of the body of the cover, means for fastening the respective folds to the body of the cover, a cam member for supporting the final fold of the cover in close relation to the adjacent portion of the cover as the cover approaches a fastening position, means for positioning the packet in accurate relation to the fastening means, said positioning means including a movable head for acting on one end of the packet, and means for periodically operating said head.

31. In a match packeting machine having an endless conveyer including means to support at one side of the conveyer the tails of a succession of rows of matches threaded through cover blanks whereof each blank has long and short upstanding flaps, means for folding the short flap of each succeeding cover, means for fastening the short flap to the body of the cover, means for folding the long flap upon the folded short flap and then reverting the free portion of the long flap against the opposite side of the body of the cover, means for fastening the respective folds to the body of the cover, a cam member for supporting the final fold of the cover in close relation to the adjacent portion of the cover as the cover approaches a fastening position, means for positioning the packet in accurate relation to the fastening means, said positioning means including a movable head for acting on one end of the packet and a movable member for acting on one side of the packet, and means for simultaneously operating said heads in timed relation to the travel of the conveyer.

LUCIAN E. PARKER